United States Patent
Wigdahl et al.

(10) Patent No.: US 12,538,872 B2
(45) Date of Patent: Feb. 3, 2026

(54) WRAP FLOOR CONTROL

(71) Applicant: DEERE & COMPANY, Moline, IL (US)

(72) Inventors: Jeffrey S. Wigdahl, Ames, IA (US); Ryan A. Hackert, Polk City, IA (US); Jeffrey R. Fox, Minburn, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/735,631

(22) Filed: Jun. 6, 2024

(65) Prior Publication Data

US 2025/0031627 A1 Jan. 30, 2025

Related U.S. Application Data

(60) Provisional application No. 63/516,174, filed on Jul. 28, 2023.

(51) Int. Cl.
| | |
|---|---|
| A01F 15/07 | (2006.01) |
| B65B 11/02 | (2006.01) |
| B65B 57/12 | (2006.01) |
| A01F 15/08 | (2006.01) |

(52) U.S. Cl.
CPC ........ A01F 15/0715 (2013.01); B65B 11/025 (2013.01); B65B 57/12 (2013.01); *A01F 2015/076* (2013.01); *A01F 15/085* (2013.01)

(58) Field of Classification Search
None
See application file for complete search history.

(56) References Cited

U.S. PATENT DOCUMENTS

| | | | | |
|---|---|---|---|---|
| 5,433,059 A | * | 7/1995 | Kluver | ................ A01F 15/0715 53/118 |
| 7,694,491 B2 | * | 4/2010 | Noonan | ................ A01F 15/071 53/461 |
| 11,375,669 B2 | | 7/2022 | Hackert et al. | |

* cited by examiner

Primary Examiner — Chinyere J Rushing-Tucker

(57) ABSTRACT

A wrap floor control system for a wrap floor of a cotton harvester with a cotton module forming chamber includes an actuator that moves the wrap floor and a timer module. A floor engagement module commands the wrap floor actuator to move the wrap floor to an engaged position in response to determining initiation of the wrap cycle and commands the wrap floor actuator to move the wrap floor to a disengaged position in response to the timer module indicating that the timer is equal to or greater than a first threshold value. A belt control module drives a wrap floor belt in response to determining initiation of the wrap cycle.

18 Claims, 19 Drawing Sheets

WRAP FLOOR CONTROL

CROSS-REFERENCE TO RELATED APPLICATIONS

This application claims the benefit of U.S. Provisional Application No. 63/516,174, filed Jul. 28, 2023. The entire disclosure of the application referenced above is incorporated by reference.

FIELD

The present disclosure relates to the control of a wrap floor, and more particularly to the control of a wrap floor in a cotton harvester.

BACKGROUND

Round module builders or balers use belts and rollers to manipulate harvested material into a desired form. A round module builder for a cotton harvester typically uses belts under tension running on a series of rollers to compact the harvested material into a cylindrical shape.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A wrap floor control system for a wrap floor of a cotton harvester with a cotton module forming chamber, the wrap floor control system includes an actuator connected to the wrap floor and configured to move the wrap floor, a timer module configured to (i) in response to determining initiation of a wrap cycle, reset and increment a timer and (ii) compare the timer to a first threshold value. The wrap floor control system also includes a floor engagement module configured to (i) in response to determining initiation of the wrap cycle, command the wrap floor actuator to move the wrap floor to an engaged position and (ii) in response determining that the timer module indicates that the timer is equal to or greater than the first threshold value, command the wrap floor actuator to move the wrap floor to a disengaged position, and a belt control module configured to in response to determining initiation of the wrap cycle, drive a wrap floor belt.

In other features, the wrap floor control system includes a wrap floor clutch. The belt control module is configured to engage the wrap floor clutch to drive the wrap floor belt.

In yet other features, the wrap floor actuator is a hydraulic cylinder.

In other features, the belt control module is configured to stop, in response to determining that the timer module indicates that the timer is equal to or greater than the first threshold value, driving the wrap floor belt.

In other features, the wrap floor control system includes a wrap length module configured to in response to determining initiation of the wrap cycle, calculate a length of wrap fed to the cotton module forming chamber and compare the length of wrap fed to the cotton module forming chamber to a second threshold value. The belt control module is configured to, in response to determining that the wrap length module indicates that the length of wrap fed to the cotton module forming chamber is equal to or greater than the second threshold value, drive the wrap floor belt.

In further features, the wrap floor control system includes a wrap roller speed sensor configured to measure a speed of a wrap roller and generate a signal based on the measured speed. The first length module is configured to calculate the first length based on the signal generated by the wrap roller speed sensor.

In yet further features, the second threshold value corresponds to 18 meters.

In other features, the wrap floor control system includes a label sensor configured to generate a separation label signal in response to detecting a presence of a separation label and a wrap length module configured to (i) calculate, in response to receiving the separation signal, a length of wrap fed to the cotton module forming chamber and (ii) compare the length of wrap fed to the cotton module forming chamber to a second threshold value. The belt control module is configured to, in response to determining that the wrap length module indicates that the length of wrap fed to the cotton module forming chamber is equal to or greater than the second threshold value, stop driving the wrap floor belt.

In other features, the label sensor is a Hall sensor.

A method of controlling a wrap floor of a cotton harvester with a cotton module forming chamber, the method includes determining whether a wrap cycle has been initiated and in response to determining that the wrap cycle has been initiated starting a timer, moving the wrap floor to an engaged position, and driving a wrap floor belt located in the wrap floor. The method also includes comparing the timer to a threshold period, moving, in response to determining that the timer is greater than or equal to the threshold period, the wrap floor to a disengaged position, monitoring an output of a label sensor, calculating, in response to the separation label sensor indicating a presence of a separation label, a first length of wrap fed to the module forming chamber, and stopping, in response to determining that the first length of wrap fed to the module forming chamber is greater than or equal to a first threshold value, the wrap floor belt.

In other features, the threshold period is 5 seconds.

In yet other features, the method includes stopping, in response to determining that the timer is greater than or equal to the threshold period, the wrap floor belt, calculating a second length of wrap fed to the module forming chamber, and driving, in response to determining that the second length of wrap fed to the module forming chamber is greater than or equal to a second threshold value, the wrap floor belt.

In further features, the first threshold value is 0.9 meters or the second threshold value is 18 meters.

In other features, the method includes monitoring a speed of a wrap roller of the cotton harvester. Calculating the second length of wrap fed to the module forming chamber includes calculating the second length based on the speed of the wrap roller.

In other features, the monitoring the speed of a wrap roller includes monitoring the speed of a lower wrap roller.

A non-transitory computer-readable medium storing processor-executable instructions for controlling a wrap floor of a cotton harvester with a cotton module forming chamber, the instructions include determining whether a wrap cycle has been initiated and in response to determining that the wrap cycle has been initiated starting a timer, moving the wrap floor to an engaged position, and driving a wrap floor belt located in the wrap floor. The method also includes comparing the timer to a threshold period, moving, and in response to determining that the timer is greater than or equal to the threshold period the wrap floor to a disengaged position, monitoring an output of a label sensor, calculating, in response to the separation label sensor indicating a presence of a separation label, a first length of wrap fed to the module forming chamber, and stopping, in response to determining that the first length of wrap fed to the module forming chamber is greater than or equal to a first threshold value, the wrap floor belt.

In other features, the instructions further include stopping, in response to determining that the timer is greater than or equal to the threshold period, the wrap floor belt, calculating a second length of wrap fed to the module forming chamber, and driving, in response to determining that the second length of wrap fed to the module forming chamber is greater than or equal to a second threshold value, the wrap floor belt.

In further features, the threshold period is 5 seconds.

In other features, the instructions include monitoring a speed of a wrap roller of the cotton harvester. Calculating the first length of wrap fed to the module forming chamber includes calculating the first length based on the speed of the wrap roller.

In further features, the first threshold value is 0.9 meters or the second threshold value is 18 meters.

A wrap floor control system for a wrap floor of a cotton harvester with a cotton module forming chamber, the wrap floor control system includes an actuator connected to the wrap floor and configured to move the wrap floor, a first timer module configured to in response to determining initiation of a wrap cycle (i) reset and increment a first timer and (i) compare the first timer to a first threshold value. The wrap floor control system further includes a floor engagement module configured to (i) in response to determining initiation of the wrap cycle, command the wrap floor actuator to move the wrap floor to an engaged position and (ii) in response determining that the first timer module indicates that the first timer is equal to or greater than the first threshold value, command the wrap floor actuator to move the wrap floor to a disengaged position. The wrap floor control system also includes a second timer module configured to in response to determining initiation of the wrap cycle (i) reset and increment a second timer and (ii) compare the second timer to a second threshold value and a belt control module configured to (i) in response to determining initiation of the wrap cycle, drive a wrap floor belt and (ii) in response to determining that the second timer module indicates that the second timer is equal to or greater than the second threshold value, stop driving the wrap floor belt.

In other features, the first threshold value is less than the second threshold value.

A method of controlling a wrap floor of a cotton harvester with a cotton module forming chamber, the method includes determining whether a wrap cycle has been initiated and in response to determining that the wrap cycle has been initiated: start a first timer and a second timer, move the wrap floor to an engaged position, and drive a wrap floor belt located in the wrap floor. The method also includes comparing the first timer to a first threshold period and in response to determining that the first timer is greater than or equal to the first threshold period: move the wrap floor to a disengaged position and stop the wrap floor belt. The method further includes comparing the second timer to a second threshold period and stopping, in response to determining that the second timer is greater than or equal to the second threshold period, the wrap floor belt.

A non-transitory computer-readable medium storing processor-executable instructions for controlling a wrap floor of a cotton harvester with a cotton module forming chamber, the instructions include determining whether a wrap cycle has been initiated and in response to determining that the wrap cycle has been initiated: starting a first timer and a second timer, moving the wrap floor to an engaged position, and driving a wrap floor belt located in the wrap floor. The instructions also include comparing the first timer to a first threshold period and in response to determining that the first timer is greater than or equal to the first threshold period: moving the wrap floor to a disengaged position and stopping the wrap floor belt. The instructions further include comparing the second timer to a second threshold period and stopping, in response to determining that the second timer is greater than or equal to the second threshold period, the wrap floor belt.

A wrap floor control system for a wrap floor of a cotton harvester with a cotton module forming chamber, the wrap floor control system includes an actuator connected to the wrap floor and configured to move the wrap floor and a timer module configured to: in response to determining initiation of a wrap cycle, reset and increment a timer and compare the timer to a first threshold value. The system further includes a floor engagement module configured to: in response to determining initiation of the wrap cycle, command the wrap floor actuator to move the wrap floor to an engaged position and in response determining that the timer module indicates that the timer is equal to or greater than the first threshold value, command the wrap floor actuator to move the wrap floor to a disengaged position. The system also includes a wrap length module configured to: in response to determining initiation of the wrap cycle, calculate a length of wrap fed to the cotton module forming chamber and compare the length to a second threshold value and a belt control module configured to: in response to determining initiation of the wrap cycle, drive a wrap floor belt and in response to determining that the wrap length module indicates that the length of wrap is equal to or greater than the second threshold value, stop driving the wrap floor belt.

A method of controlling a wrap floor of a cotton harvester with a cotton module forming chamber, the method includes determining whether a wrap cycle has been initiated and in response to determining that the wrap cycle has been initiated: start a timer, move the wrap floor to an engaged position, and drive a wrap floor belt located in the wrap floor. The method also includes comparing the timer to a threshold period and in response to determining that the timer is greater than or equal to the threshold period move the wrap floor to a disengaged position, calculating a length of wrap fed into the module forming chamber, and stopping, in response to determining that the length of wrap is greater than or equal to a second threshold value, the wrap floor belt.

A non-transitory computer-readable medium storing processor-executable instructions for controlling a wrap floor of a cotton harvester with a cotton module forming chamber, the instructions include determining whether a wrap cycle has been initiated and in response to determining that the wrap cycle has been initiated: start a timer, move the wrap floor to an engaged position, and drive a wrap floor belt located in the wrap floor. The instructions also include comparing the timer to a threshold period and in response to determining that the timer is greater than or equal to the threshold period move the wrap floor to a disengaged position, calculating a length of wrap fed into the module forming chamber, and stopping, in response to determining that the length of wrap is greater than or equal to a second threshold value, the wrap floor belt.

A wrap floor control system for a wrap floor of a cotton harvester with a cotton module forming chamber, the wrap floor control system includes an actuator connected to the wrap floor and configured to move the wrap floor, a timer module configured to (i) in response to determining initiation of a wrap cycle, reset and increment a timer and (ii) compare the timer to a first threshold value, and a floor engagement module configured to (i) in response to determining initiation of the wrap cycle, command the wrap floor actuator to move the wrap floor to an engaged position and (ii) in response determining that the timer module indicates that the timer is equal to or greater than the first threshold value, command the wrap floor actuator to move the wrap floor to a disengaged position. The wrap floor control system also includes a label sensor configured to generate a separation label signal in response to detecting the presence of a separation label, a wrap length module configured to (i) calculate, in response to receiving the separation signal, a length of wrap fed to the cotton module forming chamber and (ii) compare the length of wrap to a second threshold value, and a belt control module configured to (i) in response to determining initiation of the wrap cycle, drive a wrap floor belt and (ii) in response to determining that the wrap length module indicates that the wrap length is equal to or greater than the second threshold value, stop driving the wrap floor belt.

A method of controlling a wrap floor of a cotton harvester with a cotton module forming chamber, the method includes determining whether a wrap cycle has been initiated and in response to determining that the wrap cycle has been initiated: start a timer, move the wrap floor to an engaged position, and drive a wrap floor belt located in the wrap floor. The method also includes comparing the timer to a threshold period and in response to determining that the timer is greater than or equal to the threshold period, move the wrap floor to a disengaged position, monitoring the output of a label sensor, calculating, in response to the separation label sensor indicating the presence of a separation label, a second length of wrap fed to the module forming chamber, and stopping, in response to determining that the second length is greater than or equal to a second threshold value, the wrap floor belt.

A non-transitory computer-readable medium storing processor-executable instructions for controlling a wrap floor of a cotton harvester with a cotton module forming chamber, the instructions include determining whether a wrap cycle has been initiated and in response to determining that the wrap cycle has been initiated: start a timer, move the wrap floor to an engaged position, and drive a wrap floor belt located in the wrap floor. The instructions also include comparing the timer to a threshold period and in response to determining that the timer is greater than or equal to the threshold period, move the wrap floor to a disengaged position, monitoring the output of a label sensor, calculating, in response to the separation label sensor indicating the presence of a separation label, a second length of wrap fed to the module forming chamber, and stopping, in response to determining that the second length is greater than or equal to a second threshold value, the wrap floor belt.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
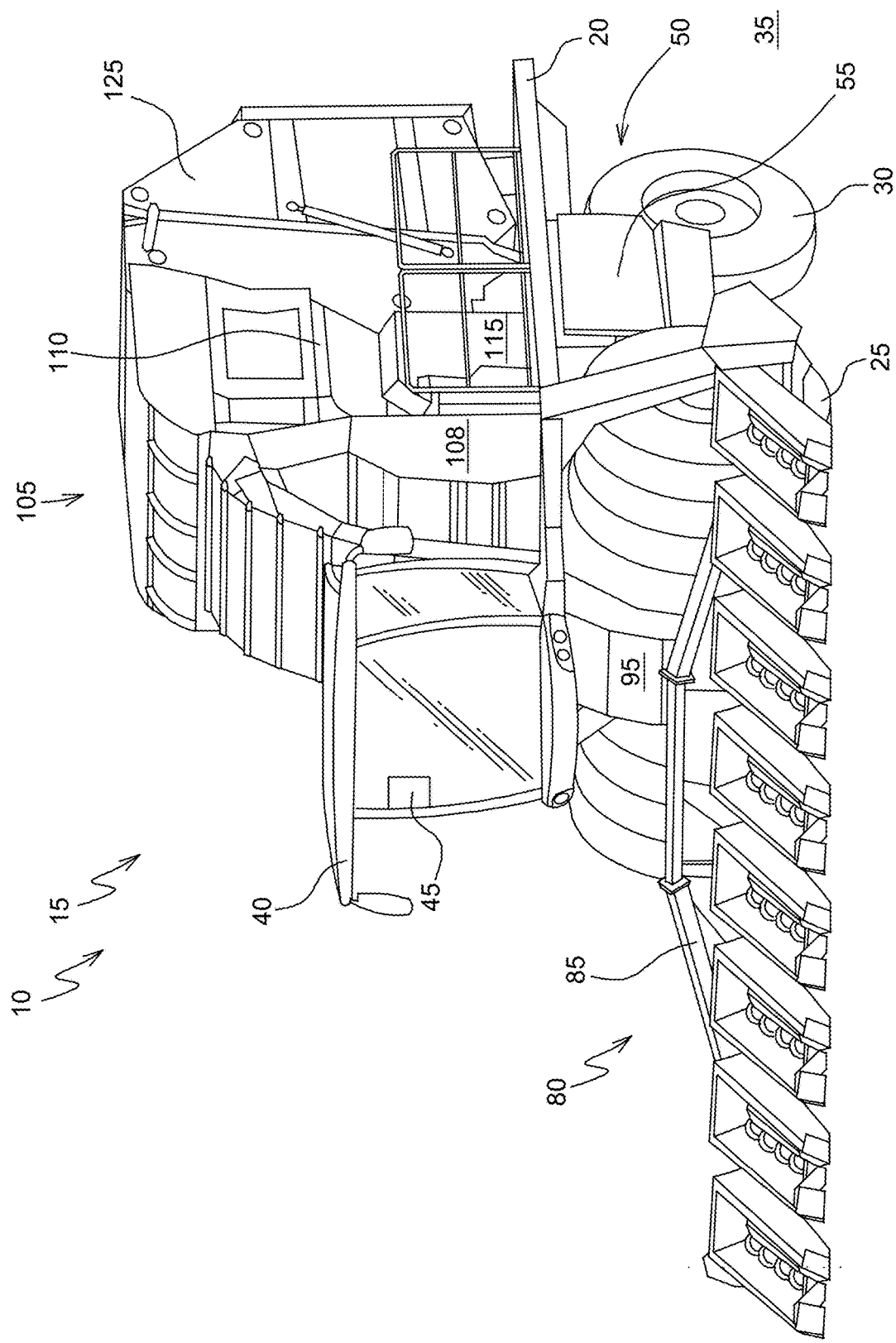
FIG. 1 is a perspective view of an example work vehicle including a wrap feeding control system according to the principles of the present disclosure.
Figure 2:
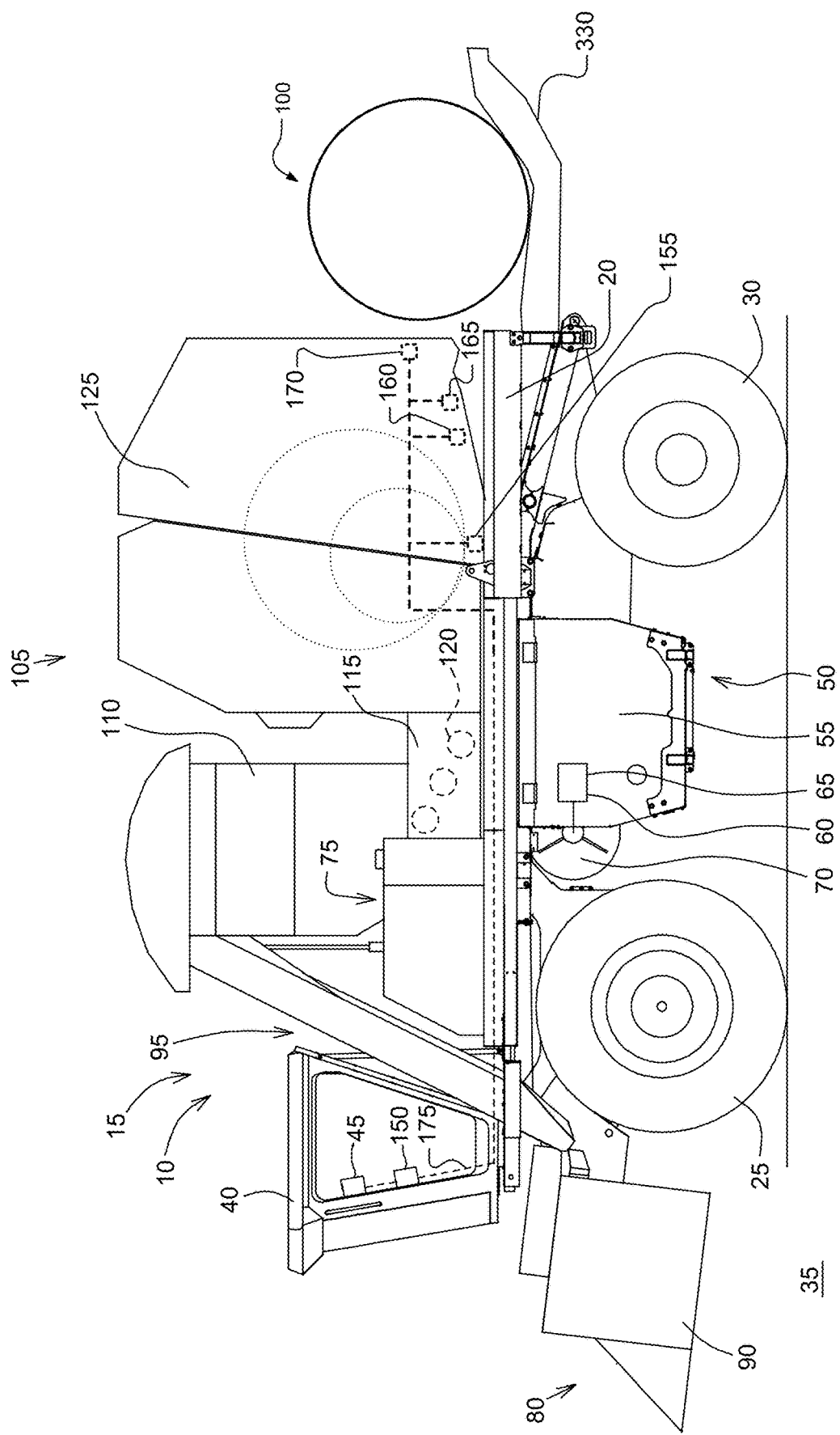
FIG. 2 is a side view of an example work vehicle including a wrap feeding control system according to the principles of the present disclosure.

FIGS. 1 and 2 illustrate an example harvester 10. The illustrated harvester 10 is a cotton harvester 15—for example, a cotton picker or a cotton stripper. Although the harvester 10 is depicted as a cotton stripper and a cotton picker, other types of work vehicles—for example, combine harvesters, tractors, self-propelled sprayers, and other types of off-road work machines—are contemplated by this disclosure.

The harvester 10 includes a chassis 20. The illustrated chassis 20 is supported by front ground engaging members 25 and rear ground engaging members 30. Although the front ground engaging members 25 and rear ground engaging members 30 of the harvester 10 are depicted as wheels, other supports are contemplated—for example, tracks. The harvester 10 is adapted for movement through a field 35 to perform a task, such as harvesting crops. As examples only, harvester 10 may be configured to harvest cotton, corn, soybeans, canola, stover, hay, alfalfa, or other agricultural crops. An operator station 40 is supported by the chassis 20.

An operator interface 45 is positioned in the operator station 40. In some implementations, the operator interface 45 includes a display screen—for example, a liquid crystal display (LCD), a light emitting diode (LED) screen, an organic LED (OLED) screen, or a CRT display. The display screen of the operator interface 45 may present, via a graphical user interface (GUI), various features and/or parameters of the harvester 10. In various implementations, the operator interface 45 may include one or more user input devices—for example, buttons, switches, touch screens, and/or levers. The operator of the harvester 10 may adjust various operating parameters of the harvester 10 via the operator interface 45—for example, by actuating one or more of the user input devices.

Referring to FIG. 2, a power module 50 may be supported below the chassis 20. The power module may be an engine 55 that drives a hydraulic motor 60 or a mechanical drive 65 to power a variable pitch fan 70. An operator may set a minimum power for the power module 50 from the operator interface 45. The operator may also set a minimum engine speed from the operator interface 45. Water, lubricant, and fuel tanks, indicated generally at 75, may be supported on the chassis 20.

A harvesting structure 80 is coupleable to the chassis 20. The illustrated harvesting structure 80 is configured to remove cotton from the field 35. The harvesting structure 80 may be a cotton stripper header 85 (FIG. 1), one or more cotton picking units 90 (FIG. 2), or another harvesting structure. Alternatively, the harvesting structure 80 may be configured to remove corn or another crop—for example, the harvesting structure 80 may a corn header or a draper header (not shown).

With reference to FIGS. 1 and 2, an air duct system 95 is coupleable to the harvesting structure 80. A round module builder 105 is coupleable to the air duct system 95. The illustrated round module builder 105 includes a cleaner 108 that cleans the cotton harvested from the cotton stripper header 85 by removing trash and debris. With reference to FIG. 2, the round module builder 105 includes an accumulator 110 that is configured to receive cotton, or other crop, harvested by the cotton-picking units 90.

With continued reference to FIG. 2, a feeder 115 is coupleable to the chassis 20. The feeder 115 is configured to receive cotton, or other crop, from the accumulator 110. The feeder 115 includes a plurality of rollers 120 configured to compress the cotton, or other crop, and transfer the cotton, or other crop, to a baler 125 of the round module builder 105.

As shown in FIG. 2, the harvester 10 includes a wrap floor control module 150, a wrap floor actuator 155, a wrap floor clutch 160, a separation label sensor 165, and a wrap roller speed sensor 170. The wrap floor actuator 155 controls movement of a wrap floor of the harvester 10. The wrap floor clutch 160 selectively powers belts located in the wrap floor.

The separation label sensor 165 generates a signal that indicates the presence of a separation label on the wrap. In various implementations, the separation label sensor 165 is a Hall sensor—i.e., a Hall effect sensor. In other implementations, the separation label sensor 165 may be an optical sensor or another sensor capable of detecting the presence a label on a wrap portion. The operator interface 45, the wrap floor control module 150, the wrap floor actuator 155, the wrap floor clutch 160, the separation label sensor 165, and the wrap roller speed sensor 170 may exchange data—for example, parameters and instructions—via a network 175, such as a controller area network (CAN). The network 175 may include one or more data buses.

Figure 3:
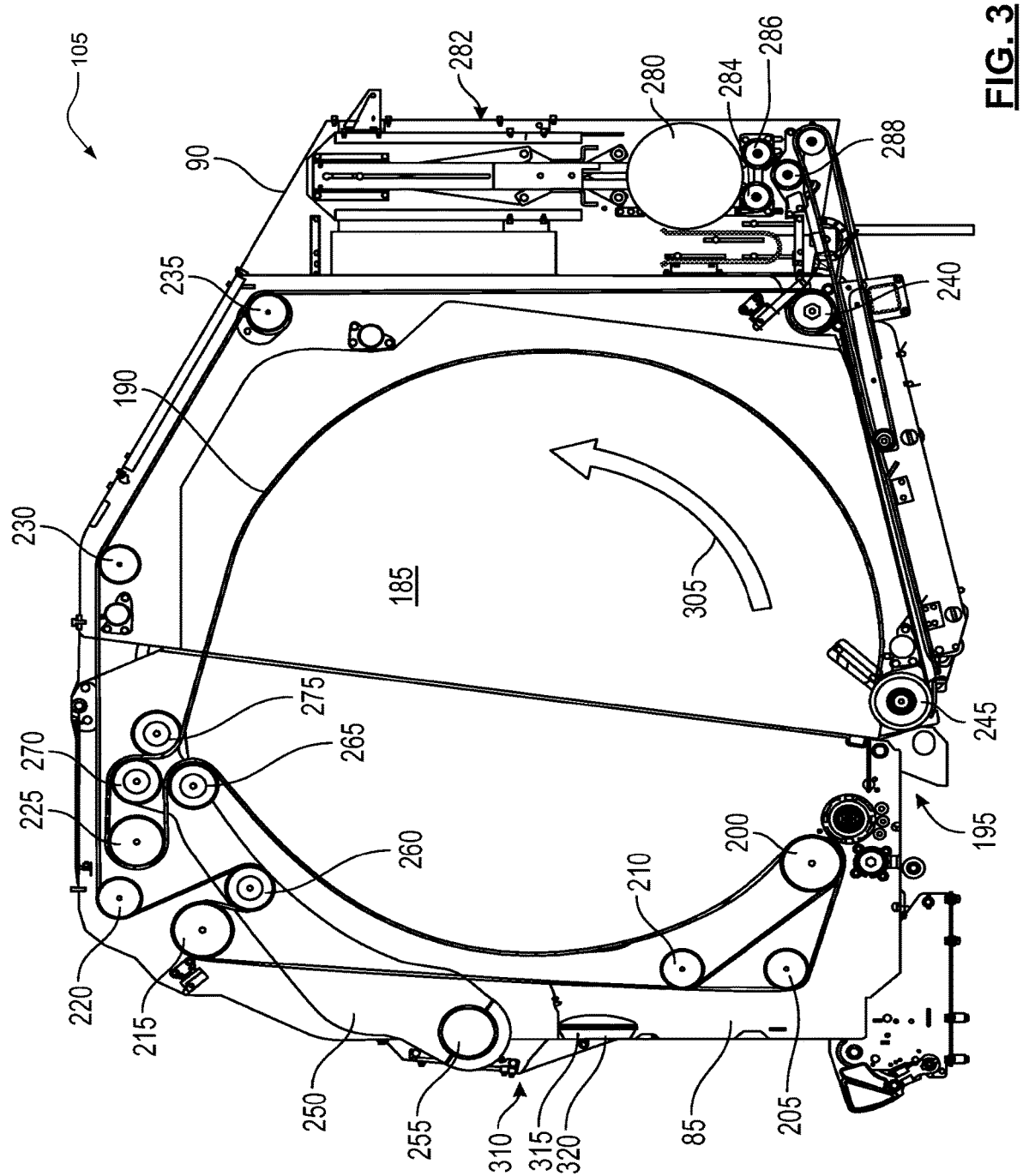
FIG. 3 is a cross-sectional side view of a round module builder.

Referring to FIG. 3, a module-forming chamber 185 may have a plurality of endless belts 190 define the circumference of the module-forming chamber 185. The plurality of endless belts 190 are supported in a side-by-side relationship across a support roll arrangement including a plurality of fixed rolls and a plurality of movable rolls. Specifically, proceeding clockwise from a chamber inlet 195 where crop enters the module-forming chamber 185, the fixed rolls include a lower drive roll 200, a first separation roll 205, a second separation roll 210, an upper drive roll 215, an upper front frame roll 220, an upper rear frame roll 225, an upper front gate roll 230, an upper rear gate roll 235, a lower rear gate roll 240, and a lower front gate roll 245 all coupled for rotation within the round module builder 105.

In FIG. 3, a conventional pair of transversely spaced belt tensioning or rockshaft arms 250 are pivotally mounted to a belt tensioning arm pivot 255. The plurality of movable rolls includes a first movable roll 260, a second movable roll 265, a third movable roll 270, and a fourth movable roll 275, which extend between and have opposite ends, respectively, rotatably coupled to the transversely-spaced belt tensioning arms 250. As illustrated, one or more of the fixed rolls are driven to cause the plurality of endless baler belts 190 to be driven, with the drive direction being such as to cause the incoming cotton, or other crop, to travel counterclockwise as it is added as a spiral layer to a growing round module 100. As the round module 100 grows within the module-forming chamber 185, the transversely spaced belt tensioning arms 250 rotate counterclockwise until a round module 100 having a predetermined diameter has been formed in the module-forming chamber 185.

Along the rear portion of the round module builder 105 may be a wrapping assembly 90 that houses one or more wrap roll 280. In the embodiment illustrated in FIG. 3, only one wrap roll 280 is shown positioned in the wrapping assembly 90. However, the wrapping assembly 90 is configured to stack multiple wrap rolls 280 on top of one another within a wrap roll hopper 282. The bottom most wrap roll 280 may rest on a front carry roller 284 and a rear carry roller 286. The front and rear carry rollers 284, 286 may be coupled to a bracket (not particularly shown) that allows the front and rear carry rollers 284, 286 to move along a linear path towards, and away from, a lower wrap roller 288.

The wrap roll 280 may be a wrap material sized to cover the exterior circumference of a round module 100. The wrap material may transition from the wrap roll 280, partially around the front carry roller 284, between the front carry roller 284 and the lower wrap roller 288, partially around the lower wrap roller 188 and to the lower front gate roll 245. Once the wrap material enters the module forming chamber 185 at the lower front gate roll 245, the wrap material may follow the endless baler belts 190 about the circumference of the round module 100 until the outer periphery is substantially covered with wrap material. For hay and forage balers, a cutting assembly (not specifically shown) may then cut the wrap material from the wrap roll and the wrap material may adhere to the round module to substantially maintain its form once ejected from the module forming chamber. In the illustrated embodiment, the wrap material is sized for individual portions from the wrap roll 280 that do not require cutting device but are sized to adhere to the round module 100 to maintain its form once ejected from the module forming chamber 185.

In one aspect of the wrapping assembly 90 illustrated in FIG. 3, the wrap material is stretched as it extends between the lower wrap roller 288 and the lower front gate roll 245. More specifically, one or more of the front and rear carry rollers 284, 286 and the lower wrap roller 288 may be powered to feed wrap material from the wrap roll 280 to the module forming chamber 185. Further, the wrap material may be pinched between the front and rear carry rollers 284, 286 and the lower wrap roller 288 as it is fed from the wrap roll 280 to the module forming chamber 185.

The powered roller 284, 286, 288 may send the wrap material toward the lower front gate roll 245 at a feed speed. The feed speed may be slightly less than the speed required to match the rotation speed of the round module 100. In one non-limiting example, the round module may have a twenty-three foot circumference and thereby require approximately twenty-three linear feet of wrap material per rotation. However, the wrapping assembly 90 may only have a feed speed of twenty-two linear feet per rotation. In this embodiment, as the wrap material transitions from the wrap roll 280 to the module forming chamber 185, the wrap material is stretched as it moves between the lower wrap roller 288 and the lower front gate roll 245.

Stretching the wrap material as it transitions from the wrapping assembly 90 to the module forming chamber 185 may provide for a tightly packed round module 100 that has a high density and therefor transports a large amount of harvested crop. Further, the wrap material may compact the round module 100 so that it maintains the proper form. Properly covering the outer surface of the round module 100 may also inhibit moister from penetrating the outer surface of the round module 100. However, if the wrap material is not evenly distributed about the outer surface, the round module 100 may lose form and fall apart or become saturated with water or the like.

In one aspect of the embodiment illustrated in FIG. 3, the lower wrap roller 288 may be rotationally coupled to the round module builder 105 at a first wall and a second wall of baler front 32 or the baler gate 28. As the wrap material is stretched between the lower wrap roller 288 and the lower front gate roll 245, the central portion of the lower wrap roller 288 may deflect towards the lower front gate roll 245 responsive to the stretch force applied by the wrap material. This deflection or bowing of the lower wrap roller 288 may cause uneven distribution of the wrap material onto the round module 100. More particularly, the center portion of the wrap material may be tighter than the edge portions as the wrap material is distributed to the surface of the round module 100 or vice versa.

Referring back to FIG. 2, after the round module 100 is formed and wrapped, a module handling system 330 may receive the round module 100. The module handling system 330 temporarily supports the round module 100 and then discharges the round module 100 from the harvester 10.

The harvester 10 is adapted for movement through a field 35 to harvest cotton. In operation, the harvester 10 is driven through the field 35 to harvest cotton or other crop. In FIG. 2, the illustrated harvesting structure 90 picks cotton from cotton plants in the field 35. In FIG. 1, the harvesting structure 85 strips the cotton from the cotton plants. Cotton is transferred to the accumulator 110 via the air duct system 95. The accumulator 110 holds the cotton until a predetermined cotton level is reached and then transfers the cotton to the feeder 115. In an implementation, the accumulator 110 transfers cotton to the feeder 115 approximately four times for each round module 100 produced. When the feeder 115 receives cotton, the plurality of rollers 120 are activated to distribute the cotton to a feed conveyor belt that transfers the cotton to the round module builder 105. The round module builder 105 uses the endless baler belts 190 to compress the cotton while forming the module 100.

After the round module builder 105 receives compressed cotton, the plurality of endless baler belts 190 rotate the cotton into the round module 100. After the round module builder 105 receives sufficient cotton from the feeder 115, the round module may be wrapped and the round module 100 can be ejected onto the module handling system 330. The module handling system 330 supports the round module 100 and then discharges it from the harvester 10.

Figure 4:
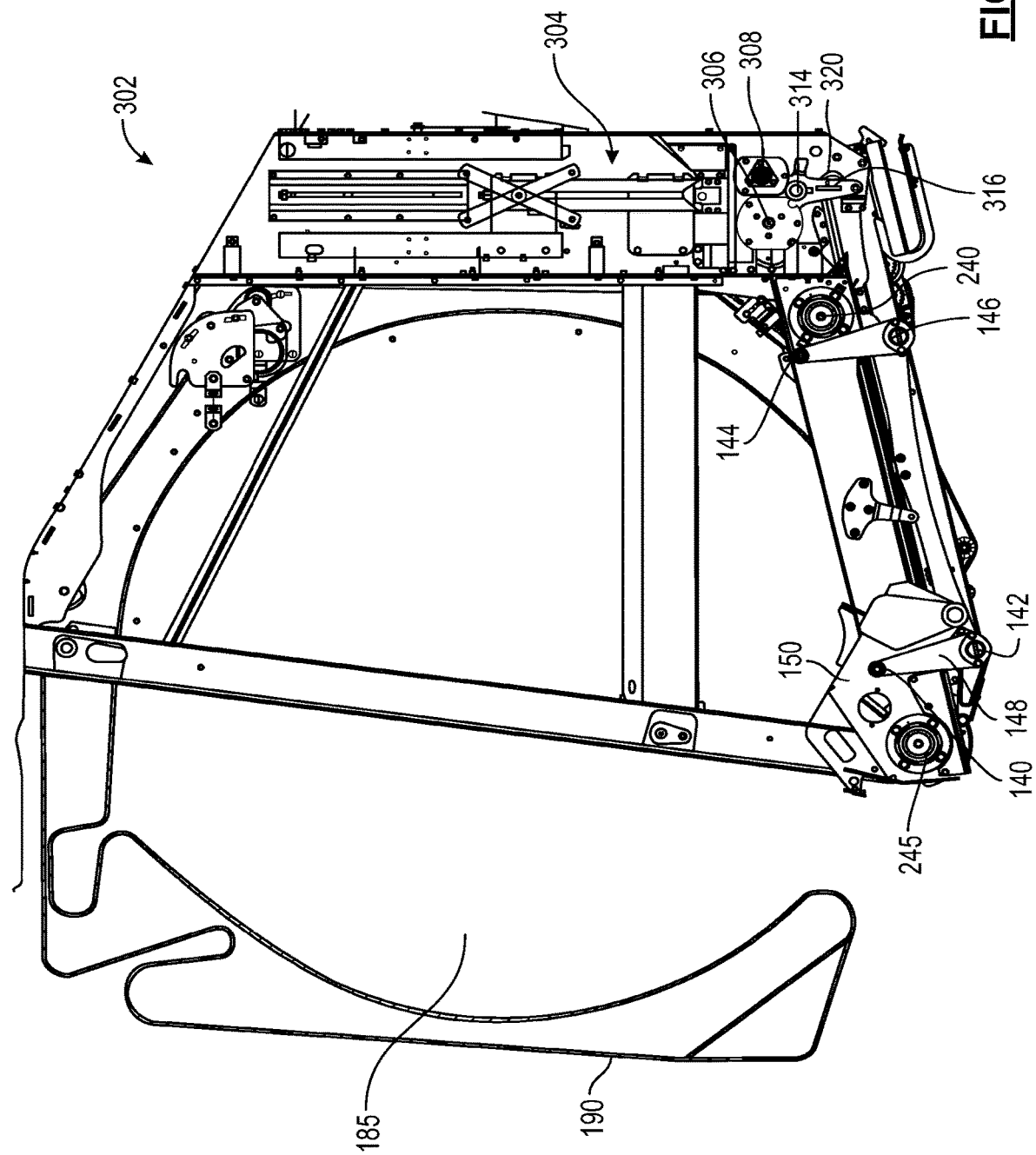
FIG. 4 is a cross-sectional view of a different embodiment of a wrapping assembly for a round module builder.
Figure 5A:
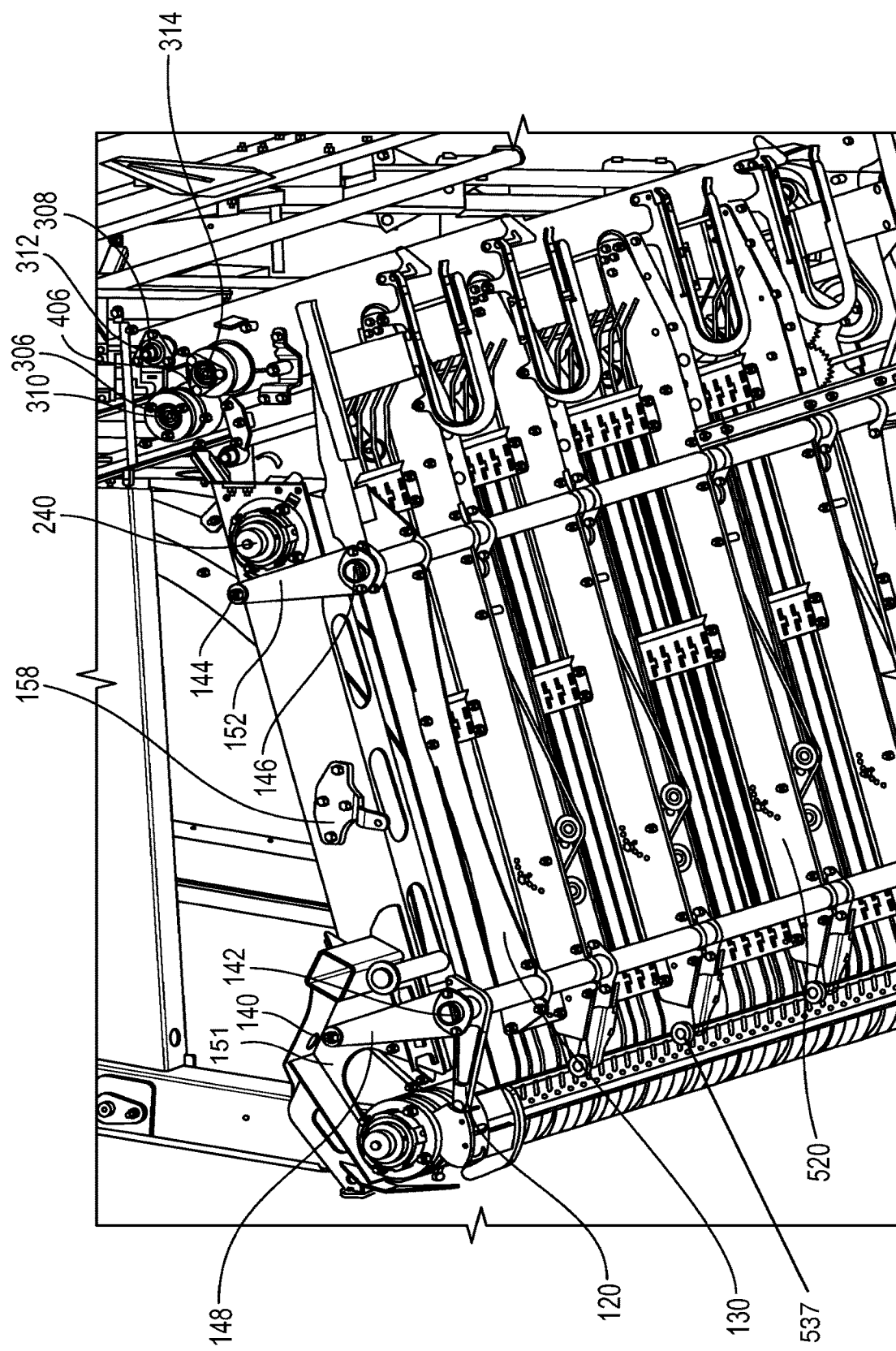
FIG. 5A is a bottom perspective view of a wrap floor system of the FIG. 4 embodiment.
Figure 5B:
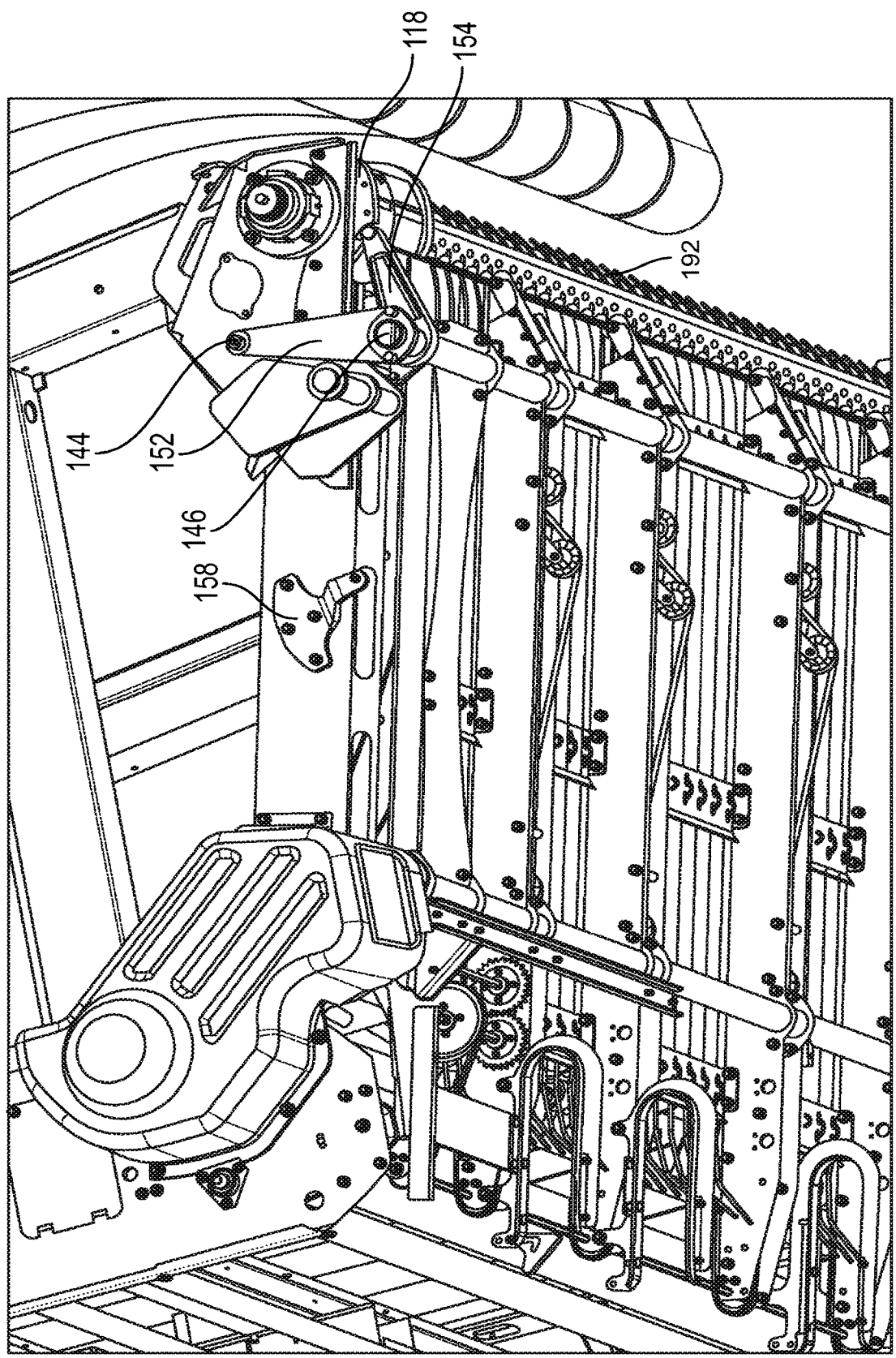
FIG. 5B is another bottom perspective view of a wrap floor system of the FIG. 4 embodiment.

Referring now to FIGS. 4, 5A, and 5B, a wrapping assembly 302 is illustrated. More specifically, the wrapping assembly 302 may have a wrap roll hopper 304 similar to the wrap roll hopper 282 described above. The wrap roll hopper 304 may provide for storage for a plurality of wrap rolls wherein the bottom-most wrap roll contacts an upper front wrap roller 306 and a carry roller 308. Both the upper front wrap roller 306 and the carry roller 308 may be rotationally coupled to the first and second walls of 32 or 28 of the round module builder 105. The upper front wrap roller 306 may be rotationally coupled to the first and second side walls of 32 or 28 about a first axis 310 and the carry roller 308 may be rotationally coupled to the first and second side walls of 32 or 28 about a carry axis 312. Both the first axis 310 and the carry axis 312 may be defined through a fixed portion of the first and second side wall of 32 or 28. The first axis 310 and the carry axis 312 may not move relative to the first and second side walls of 32 or 28 or otherwise relative to the round module builder 105.

The wrapping assembly 302 may also have a lower wrap roller 314 that is positionable adjacent to the upper front wrap roller 306. The lower wrap roller 314 may be rotationally coupled between a first bracket 316 and second bracket 318. The first bracket 316 may be pivotally coupled to the first wall of 32 or 28 about a bracket axis 320 and the second bracket may be pivotally coupled to the second wall of 32 about the bracket axis 320.

The lower wrap roller 314 may be pivotal about the bracket axis 320 between a first position (as shown in FIG. 4), and a second position. In the first position, the outer surface of the lower wrap roller 314 may be positioned adjacent to the outer surface of the upper front wrap roller 306. More specifically, in the first position the wrap material may be pinched between the upper front wrap roller 306 and the lower wrap roller 314 at a pinch point 406 (see FIG. 4). Pinching the wrap material between the upper front wrap roller 306 and the lower wrap roller 314 allows the rotation speed of the rollers 306, 314 to partially control the feed speed as is described in more detail below.

In various implementations, the outer surface of the upper front wrap roller 306 and the outer surface of the lower wrap roller 314 may be coated in a material that grips the wrap material such as rubber or the like. The outer surface of the rollers 306, 314 may then control the feed speed of the wrap material to the lower front gate roll 245 without allowing the wrap material to slip there between. In other words, the outer surface of the rollers 306, 314 may frictionally engage the wrap material as it is pinched between the respective rollers 306, 314 at the pinch point 406 and as it travels from the wrap roll to the module forming chamber 185. In this configuration, the stretch force generated on the wrap material between the lower front gate roll 245 and the lower wrap roller 314 may be insufficient to cause the wrap material to slip between the upper front wrap roller 306 and the lower wrap roller 314.

In one implementation, a biasing member (not illustrated) such as a spring or the like may be positioned between the first and second bracket 316, 318 and the corresponding first and second walls of 32 or 28 to pivot the lower wrap roller 314 about the bracket axis 320 towards the upper front wrap roller 306. The force applied to the brackets 316, 318 by the biasing member may increase the pinch force on the wrap material and thereby reduce the likeliness of the wrap material slipping there between during heavy stretch forces.

The biasing member may be any type of spring or the like known in the art and is not limited to any particular type. More specifically, the biasing member may be generated by any type of mechanical, pneumatic, hydraulic, electrical or the like force. In one non-limiting example, the biasing member 402 is a coil spring. In another example, the biasing member is a hydraulic, pneumatic, or electrical actuator. A person having skill in the relevant art understands the many different types of biasing members 402 that can be utilized to bias a pivoting member about an axis and this disclosure is not limited to any particular one.

Figure 6:
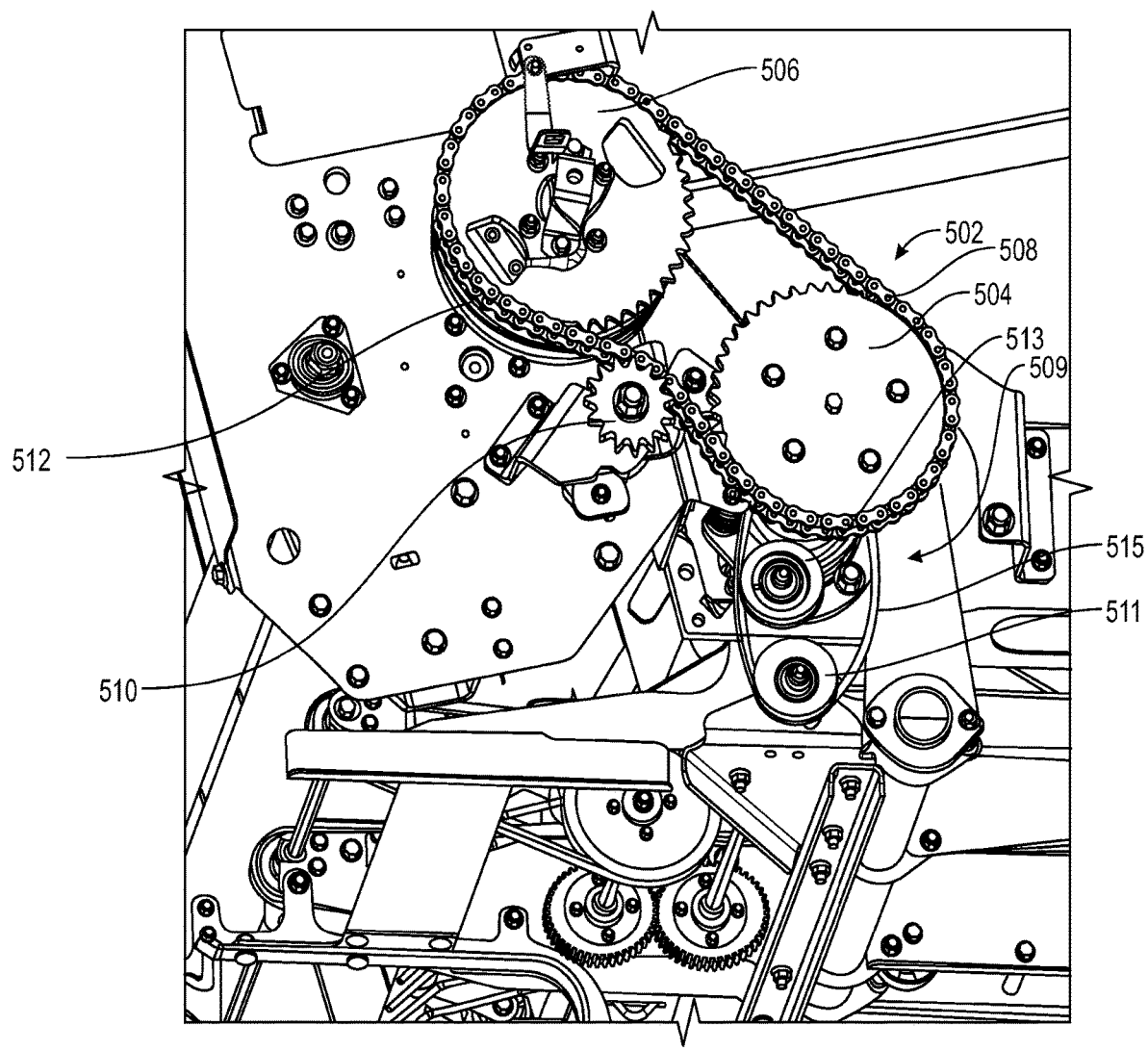
FIG. 6 is a perspective view of one embodiment of a drive system for the FIG. 4 embodiment.
Figure 7:
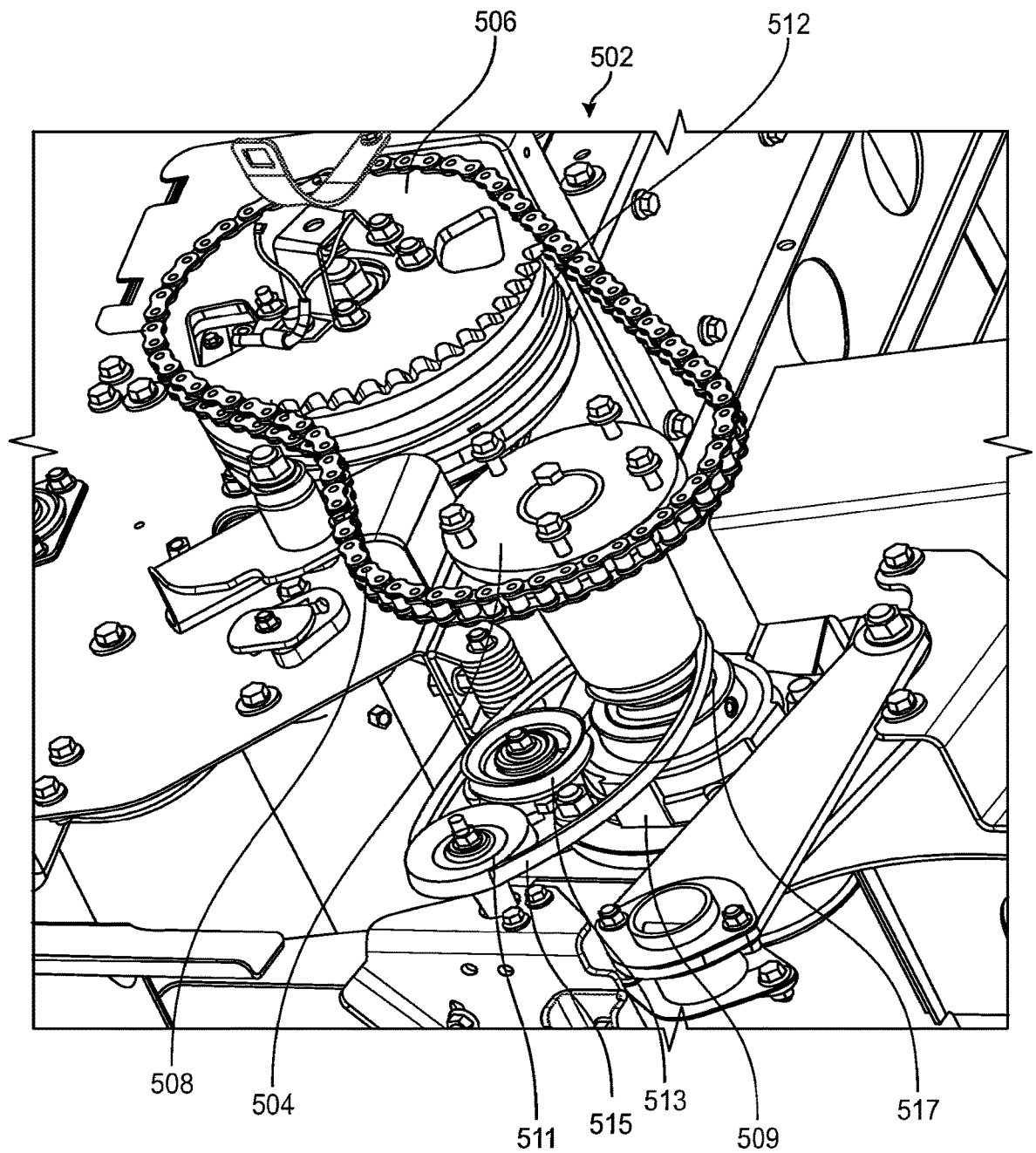
FIG. 7 is another perspective view of the drive system from FIG. 6.
Figure 8:
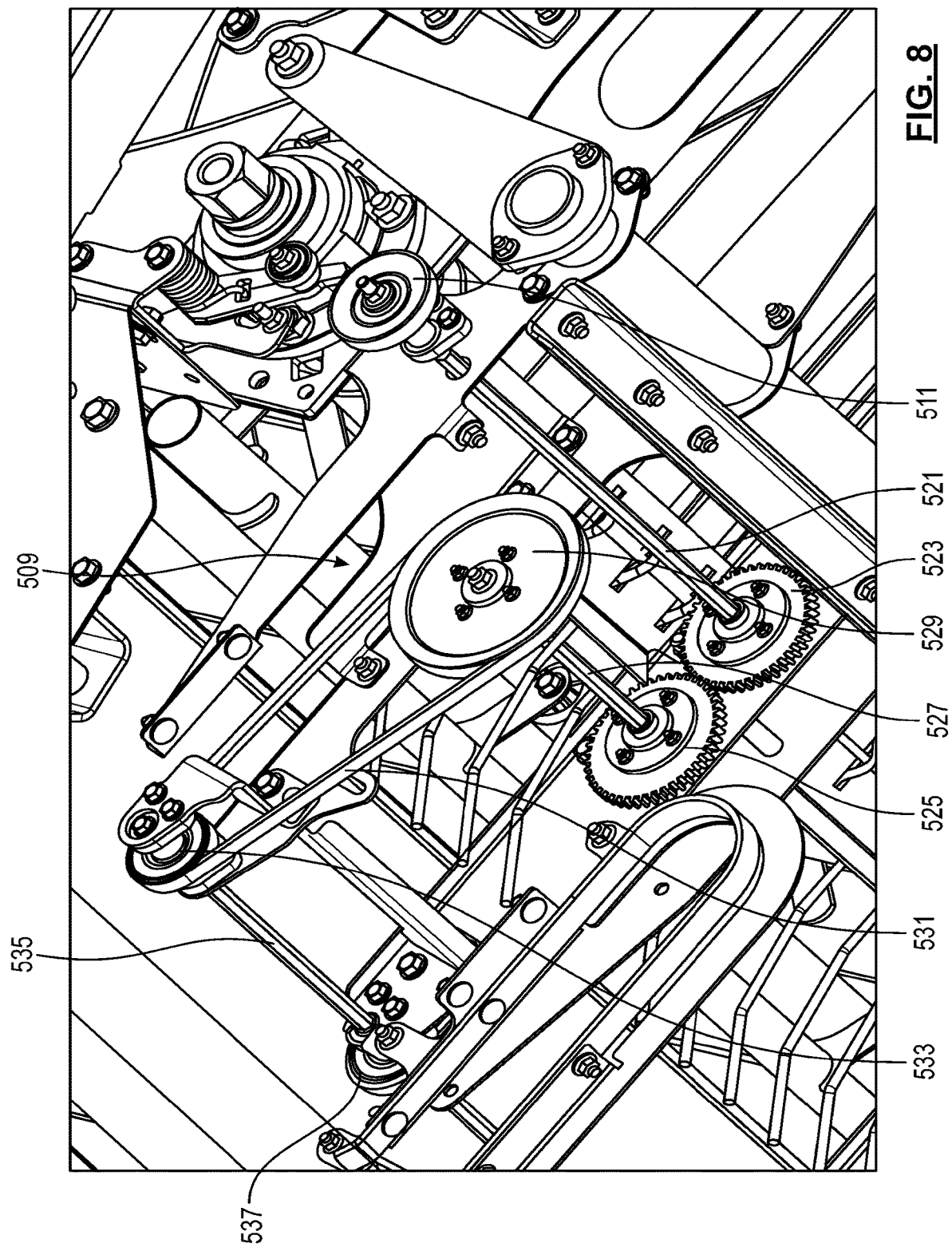
FIG. 8 is a bottom perspective view of the drive system from FIG. 6.
Figure 9:
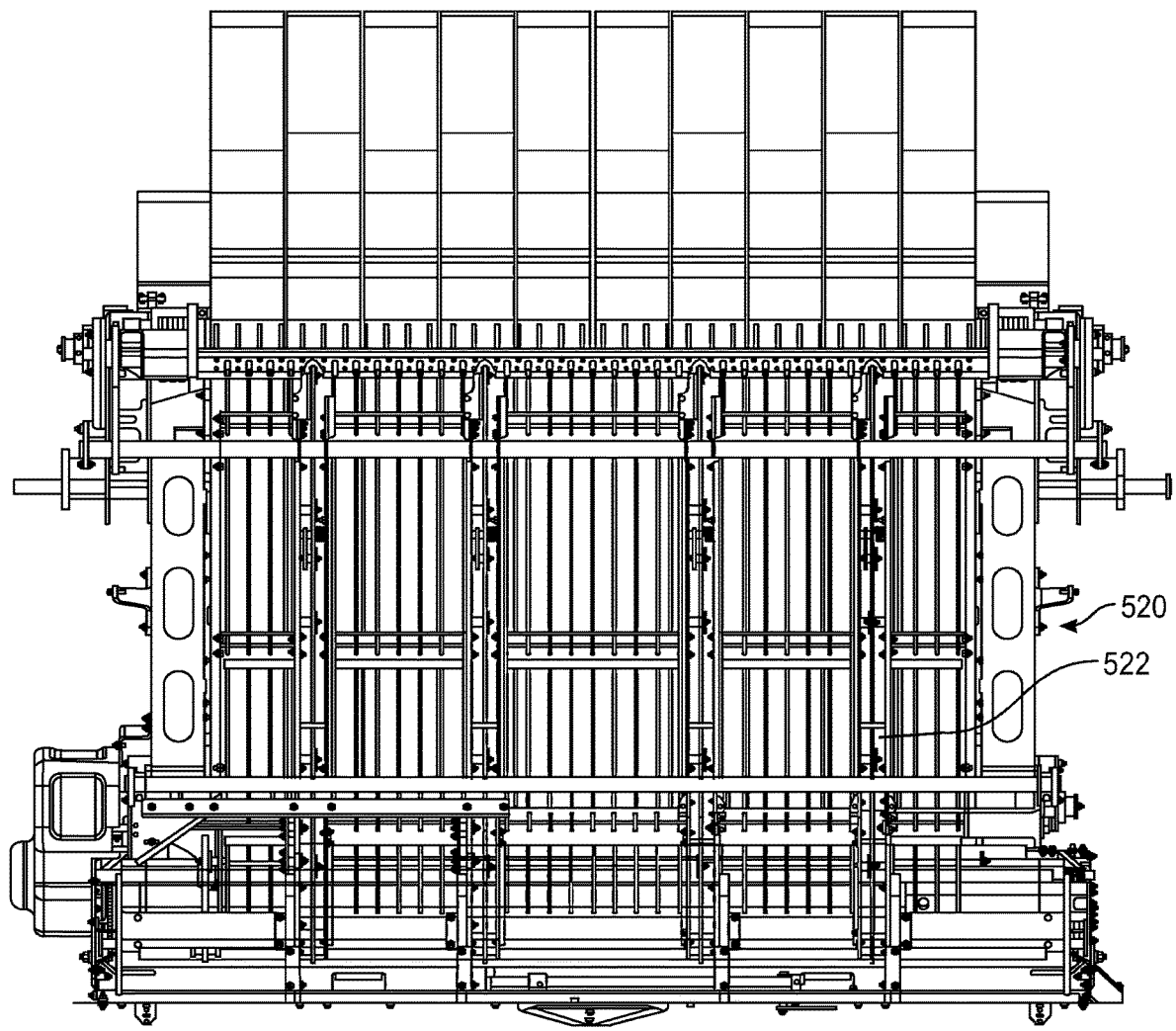
FIG. 9 is bottom view of the wrap floor system of the FIGS. 5A and 5B.

Referring now to FIGS. 6, 7, and 8, a first drive system 502 is illustrated. The first drive system 502 may have a drive sprocket 504 coupled to a driven sprocket 506 via a chain, belt, or the like 508. Further, a tensioner 510 may be positioned partially between the drive and driven sprocket 504, 506 to ensure the proper chain tension is maintained between the sprockets 504, 506. In one non-limiting embodiment, the drive sprocket 504 may be rotationally coupled to the lower rear gate roll 240 or any other roll of the module forming chamber 185. In this embodiment, the ratio of teeth of the sprockets 504, 506 may dictate the feed speed of the wrapping assembly 302 relative to the rotation speed of the rolls of the module forming chamber 185. In another non-limiting embodiment, the drive sprocket 504 may be rotationally coupled to a second drive system 509 which may be any type of system such as mechanical, pneumatic, hydraulic, electrical or the like that engages and rotates the drive sprocket 504.

As shown in FIGS. 6, 7, and 8, one form of the second drive system 509 includes a first roller 511 offset a second roller 517 and a tensioner belt 515 that wraps around the first and second rollers 511 and 517 to drive a shaft 521 of the drive sprocket 523. The belt is tensioned by the roller 513 when the wrap floor engages. In various other implementations the second drive system 509 includes the wrap floor clutch 160 that selectively provides rotational power the shaft 521. In yet other implementations, the second drive system 509 may include a dedicated or shared rotary actuator—for example, an electric or hydraulic motor—a friction wheel driven wrap system, or one or more gears that engage shaft 521 or drive sprocket 523 to generate the input motion.

In FIG. 8, the first roller 511 includes a shaft 521 operationally attached to a drive sprocket 523 that is coupled to a driven sprocket 525 through a series of teeth on each of the sprockets 523, 525 that engage each other. The driven sprocket 525 includes a shaft 527 that is operationally connected to a rear belt sheave 529. The rear belt sheave 529 receives a tensioner belt 531 that wraps around the rear belt sheave 529 and a wrap floor sheave 533 to drive a shaft 535 of a second wrap floor sheave 537. A wrap floor system 520, further described below, includes one of the second wrap floor sheaves 537 associated with each wrap floor belt wherein each of the second wrap floor sheaves 537 is assembled with the shaft 535 that extends across a width of the wrap floor system 520.

The driven sprocket 506 may have a shaft (not particularly shown) coupling the driven sprocket 506 to a drive gear 512 of the first drive system 502. The drive gear 512 may further be in contact with the upper front wrap roller 306 that is in turn selectively in contact with the lower wrap roller 314.

When the rollers 306, 314 are in the first position, the rotational movement of the lower rear gate roll 240 rotates the drive sprocket 504. The rotation of the drive sprocket 504 is transferred to the driven sprocket 506 through the chain 508. From the driven sprocket 506 the shaft rotates the drive gear 512. The drive gear 512 rotates the corresponding upper front wrap roller 306 and the lower wrap roller 314. Rotation of the drive sprocket 504 also activates the second drive system 509 such that the shaft 535 and the second wrap floor sheave 537 rotate.

While the drive gear 512 is described as powered through a mechanical linkage to the lower rear gate roll 240, the drive gear 512 or the upper front wrap roller 306 and the lower wrap roller 314 may be independently powered. More specifically, hydraulic, pneumatic, electrical, or the like motors may be coupled directly to any one of the above-mentioned rollers, gears, or sprockets to provided rotational power thereto. A controller—for example a BIC—may communicate with the motor of the respective roller, gear, or sprocket to dictate the feed speed generated by the wrapping assembly 302.

The wrap speed sensor 170 measures a speed of a wrap roller of the wrapping assembly and generates a signal that represents the speed of the wrap roller. In various implementations, the wrap speed sensor 170 measures the speed of the lower wrap roller 314 and generates a signal that indicates the rotational speed of the lower wrapper roller 314. In other implementations, the wrap speed sensor 170 measures the speed of the upper front wrap roller 306 or another roller in the wrapping assembly 302.

A wrap floor 520 is positioned partially between the wrapping assembly 302 and the module forming chamber 185. The wrap floor 520 may have a plurality of continuous wrap floor belts 522 or the like positioned thereon. The wrap floor belts 522 and the wrap floor 520 may guide the wrap material, in part, from the wrap roll to the lower front gate roll 245 and ultimately into the module forming chamber 185.

The carry roller 308 may not be directly coupled to the first drive system 502. Rather, the carry roller 308 may be free to rotate as the wrap roll placed thereon rotates. In other words, the carry roller 308 may be an idler roller that supports the wrap roll while simultaneously allowing the wrap roll to rotate as wrap material is fed to the module forming chamber 185. Further, the carry roller 308 may be spaced from the upper front wrap roller 306 to provide a cradle or the like between the rollers 306, 308 to allow the wrap roll to sit thereon. The rollers 306, 308 may maintain the proper positioning of the wrap roll while facilitating rotation as directed by the first drive system 502.

As further illustrated in FIGS. 5A, 5B, and 8, the wrap floor system 520 includes a plurality of wrap floor frame supports 130 which provides support for the wrap floor belts 522, which are located beneath the round module builder or endless baler belts 190 which move along the wrap floor belt 522, the lower rear gate roll 240, and the lower front gate roll 245, as would be understood by those skilled in the art. The wrap floor 520 moves generally longitudinally along the length of the harvester 10 in response to wrap floor actuator 155. Wrap is moved between the wrap floor belt 522 and the module builder belt to wrap the cotton to provide a cotton module.

The wrap floor 520 is configured to move longitudinally as well as to rotate about a four bar linkage having a first axis of rotation 140, a second axis of rotation 142, a third axis of rotation 144, and a fourth axis of rotation 146. The first axis of rotation 140 is located at one end of a bar 148 which is rotatably coupled to a stationary frame member 151. The second axis of rotation is located at another end of the bar 148. The third axis of rotation 144 is located at one end of a bar 152 rotatably coupled to a second bar 154. The fourth axis of rotation 146 is located at another end of the bar 152 which also identifies a rotation axis of the second bar 154.

The second bar 154 extends from the axis 146 to the bar 118 and is coupled to the wrap floor actuator 155 which is coupled to a fixed bracket 158. Movement of the wrap floor actuator 155 engages and disengages bar 118 and thus the wrap floor system 520 with the endless baler belts 190.

In some implementations, the wrap floor actuator 155 is a hydraulic actuator which is coupled to a valve (not shown), the function of which is controlled by the wrap floor control module 150, which when instructed, moves the hydraulic cylinder to start a wrap cycle.

Movement of the wrap floor 520, which includes the frame supports 130, is generally along a longitudinal axis defined by the plane of the wrap floor belt 522. The second bar 154, however, moves in both a longitudinal direction as well as an upward or inclined direction with the lower rear gate roll 240 due to its four bar linkage configuration. The wrap floor actuator 155 pushes the second bar 154, and consequently the bar 118 forward to the engaged position illustrated in FIGS. 5A and 5B. When the wrap is completed, the wrap floor actuator 155 pulls the bar 118 to a disengaged position and the wrap floor system 520 returns to an unengaged position.

The bar 118 also supports a plurality of wrap fingers 192 which are fixedly coupled to and extend from the bar 118. Upward movement of the bar 118 directs the wrap finger 192 upwardly as well.

The second drive system 509 uses a positive drive source. In the illustrated implementations, the wrap floor system 520 includes a single set of wrap floor belts 522. In other implementations, the wrap floor system 520 may include two or more sets of wrap floor belts that work together. The second drive system 509 does not require any friction contact between the wrap floor belts 522 and the baler belts 190 to generate rotation of the wrap floor belts 520. An individual stand-alone motor or any other type of drive input could be used to drive the wrap floor system 520 and the wrap floor belts 522.

Figure 10:
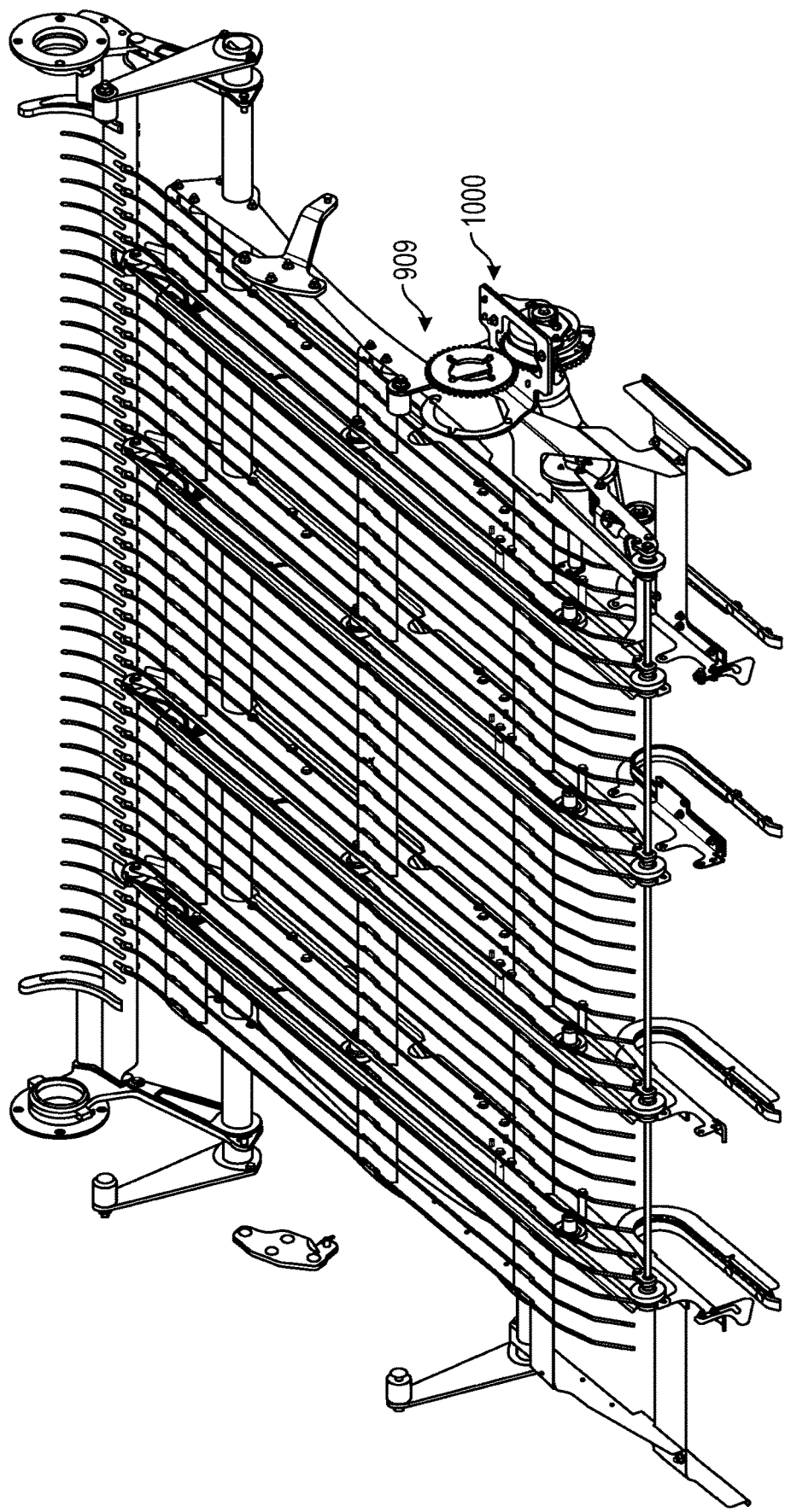
FIG. 10 is another embodiment of a second drive system.

Illustrated in FIG. 10 is yet another embodiment of a second drive system 909. The second drive system 909 also uses an input from the rear lower gate roller 240 (not illustrated) to generate rotation. The second drive system 909 includes an electric clutch 1000—for example, the wrap floor clutch 160. When the wrap cycle begins, an electrical signal (current) is sent to the electric wrap clutch to engage the clutch. The clutch then creates input rotation through a telescoping driveshaft to the secondary wrap floor drive turning the wrap floor belts 522 (not illustrated). The telescoping driveshaft is to allow the wrap floor to move through its range during the engage and disengaged motions. When the electrical signal is turned off, the clutch disengages halting the rotation of the secondary drive and the main wrap floor belts. In various implementations, the wrap clutch is directly driven through a set of gears as the direction needs to be reversed so the baler belts and wrap floor belts are moving in the same direction. A set of belts, chain and sprocket, or some other type of drive to generate the input to the clutch from a different location in the round module builder 105 could be used.

Figure 11:
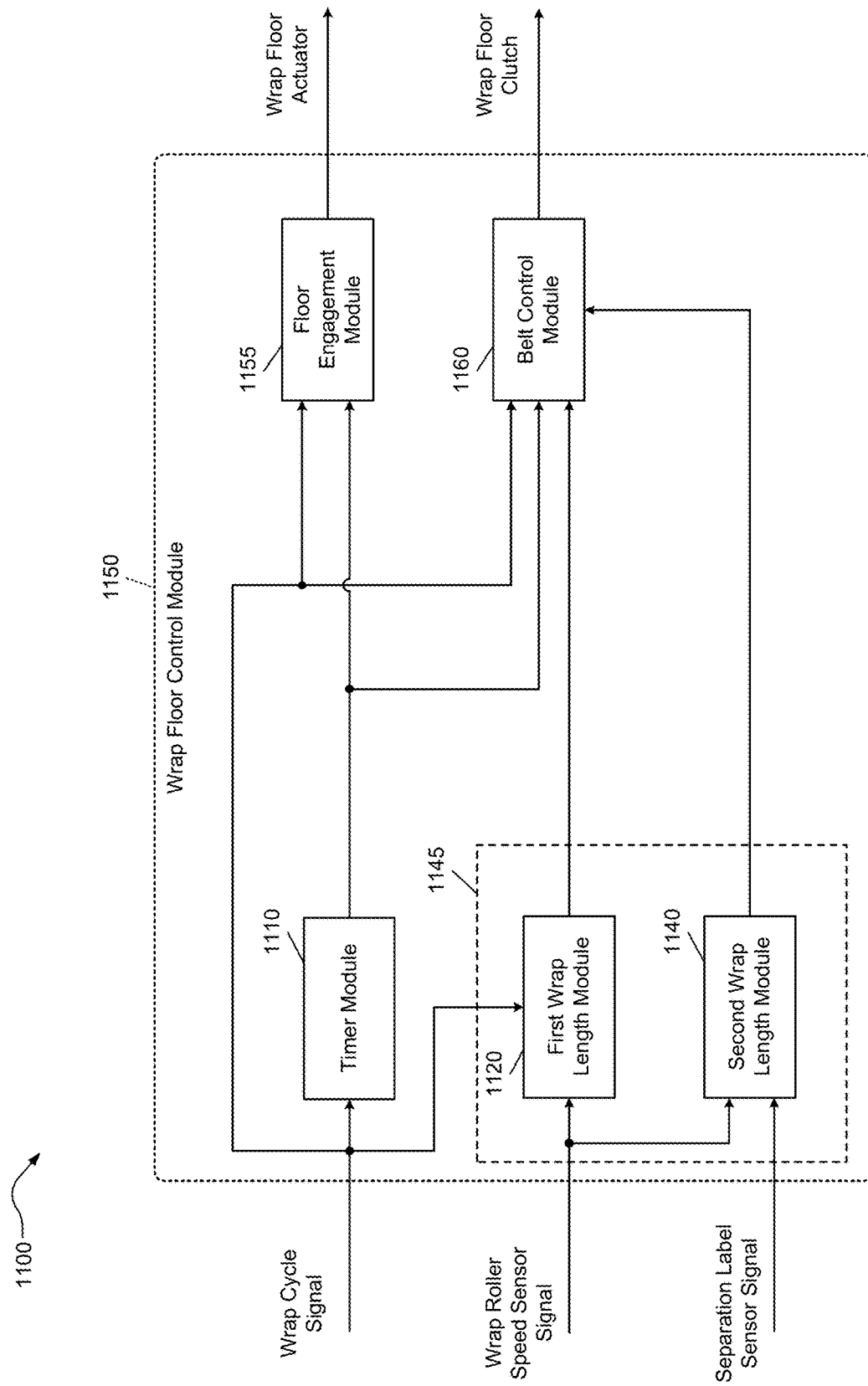
FIG. 11 is functional block diagram of an example implementation of a wrap feeding control system according to the principles of the present disclosure.

FIG. 11 is a functional block diagram of an example implementation of a wrap floor control system 1100. In various implementations, the wrap floor control system 1100 includes a wrap floor control module 1150, the wrap floor actuator 155, the wrap floor clutch 160, the separation label sensor 165, and the wrap roller speed sensor 170. The wrap floor control module 1150 is one implementation of the wrap floor control module 150 and may include a timer module 1110, a first wrap length module 1120, a second wrap length module 1140, a floor engagement module 1155, and a belt control module 1160.

In various examples, the wrap floor control module 1150 may be a standalone module in the harvester 10, as illustrated in the example of FIG. 2. In other examples, at least one of the timer module 1110, the first wrap length module 1120, the second wrap length module 1140, the floor engagement module 1155, and the belt control module 1160 may be implemented independently or with one or more other modules of the harvester 10—for example, a baler interface controller (BIC).

The timer module 1110 generates a timer value that indicates the amount of time that has elapsed since a wrap cycle was initiated. In response to receiving a signal that indicates initiation of a wrap cycle, the timer module 1110 resets a timer to zero and then begins to increment the timer. The timer module 1110 compares the timer value to a period (or value) and outputs the results of the comparison to the floor engagement module 1155 and the belt control module 1160. In some implementations, the period is a predetermined period. For example, the period may be or correspond to approximately 5 seconds. As another example, the period may be or correspond to between 5 and 20 seconds. In other implementations, the period may be set to an initial period—for example, 5 seconds or 15 seconds—and an operator of the harvester 10, via the operator interface 45, may change the period to another suitable period.

The first wrap length module 1120 receives a signal from the wrap roller speed sensor 170. In various implementations, the signal from the wrap roller speed sensor 170 indicates the speed of the wrap roller in revolutions per minute (RPMs). The circumference of the wrap roller is stored in the first wrap length module 1120. Based on the signal received from the wrap roller speed sensor 170, the first wrap length module 1120 calculates the length of wrap fed to the module forming chamber 185 since the wrapping cycle was initiated.

In response to receiving a signal that indicates initiation of the wrap cycle, the first wrap length module 1120 resets a first measured length to zero. The first wrap length module 1120 then updates the value of the first measured length based on the received wrap roller speed signal, the circumference of the roller, and the amount of time that has elapsed since the value of the first measured length was last updated. The first wrap length module 1120 continues to update the first wrap length until it receives a signal that indicates that a new wrap cycle has been initiated.

The first wrap length module 1120 compares the first measured length to a first threshold value and outputs the results of the comparison to the belt control module 1160. In some implementations, the first threshold value is a predetermined length. For example, the first threshold value may be or correspond to 18 meters. As another example, the first threshold value may be or corresponds to 16-24 meters. In other implementations, the first threshold value may be set to an initial value—for example, 18 meters—and an operator of the harvester 10, via the operator interface 45, may change the first threshold value to another suitable length.

Similar to the first wrap length module 1120, the second wrap length module 1140 receives the wrap roller speed signal from the wrap roller speed sensor 170 and stores the circumference of the wrap roller. In response to receiving a signal that indicates the presence of a separation label, the second wrap length module 1140 resets a second measured length to zero. The second wrap length module 1140 then updates the value of the second measured length based on the received wrap roller speed signal, the circumference of the roller, and the amount of time that has elapsed since the value of the second measured length was last updated.

The second wrap length module 1140 compares the second measured length to a second threshold value and outputs the results of the comparison to the belt control module 1160. In some implementations, the second threshold value is a predetermined length. For example, the second threshold value may be or correspond to 0.9 meters. As another example, the second threshold value may be or correspond to 0.5-1.5 meters. In other implementations, the second threshold value may be set to an initial value—for example, 0.9 meters—and an operator of the harvester 10, via the operator interface 45, may change the second threshold value to another suitable length.

In some implementations, the first wrap length module 1120 and the second wrap length module 1140 may be separate modules in the wrap floor control module 1150, as illustrated in FIG. 11. In other examples, the wrap floor control module 1150 may include a length module 1145 that includes both the first wrap length module 1120 and the second wrap length module 1140.

The floor engagement module 1155 generates one or more signals that control movement of the wrap floor. In response to receiving a signal that indicates initiation of a wrap cycle, the floor engagement module 1155 outputs a signal that causes the wrap floor to engage. Conversely, in response to receiving a signal that indicates the period of time has elapsed since the wrap cycle was initiated, the floor engagement module 1155 outputs a signal that causes the wrap floor to disengage. As shown in FIG. 11, the floor engagement module 1155 outputs the generated signal to the wrap floor actuator 155.

The belt control module 1160 generates one or more signals that control the movement of the wrap floor belts. In response to either receiving a signal that indicates initiation of a wrap cycle or determining that the first wrap length module 1120 indicates that the first length of wrap has been fed to the module forming chamber 185, the belt control module 1160 generates a signal that causes the wrap floor belts to be driven. In response determining that either the timer module 1110 indicates that the period of time has elapsed since the wrap cycle was initiated or the second wrap length module 1120 indicates that the second length of the wrap portion has been fed to the module forming chamber 185, the belt control module 1160 generates a signal that causes the wrap floor belts to stop.

As shown in FIG. 11, the belt control module 1160 outputs a signal to the wrap floor clutch 160 that causes the wrap floor clutch 160 to either engage or disengage. In other implementations, the belt control module 1160 outputs the generated control signal to a motor that drives that wrap floor belts.

Figure 12:
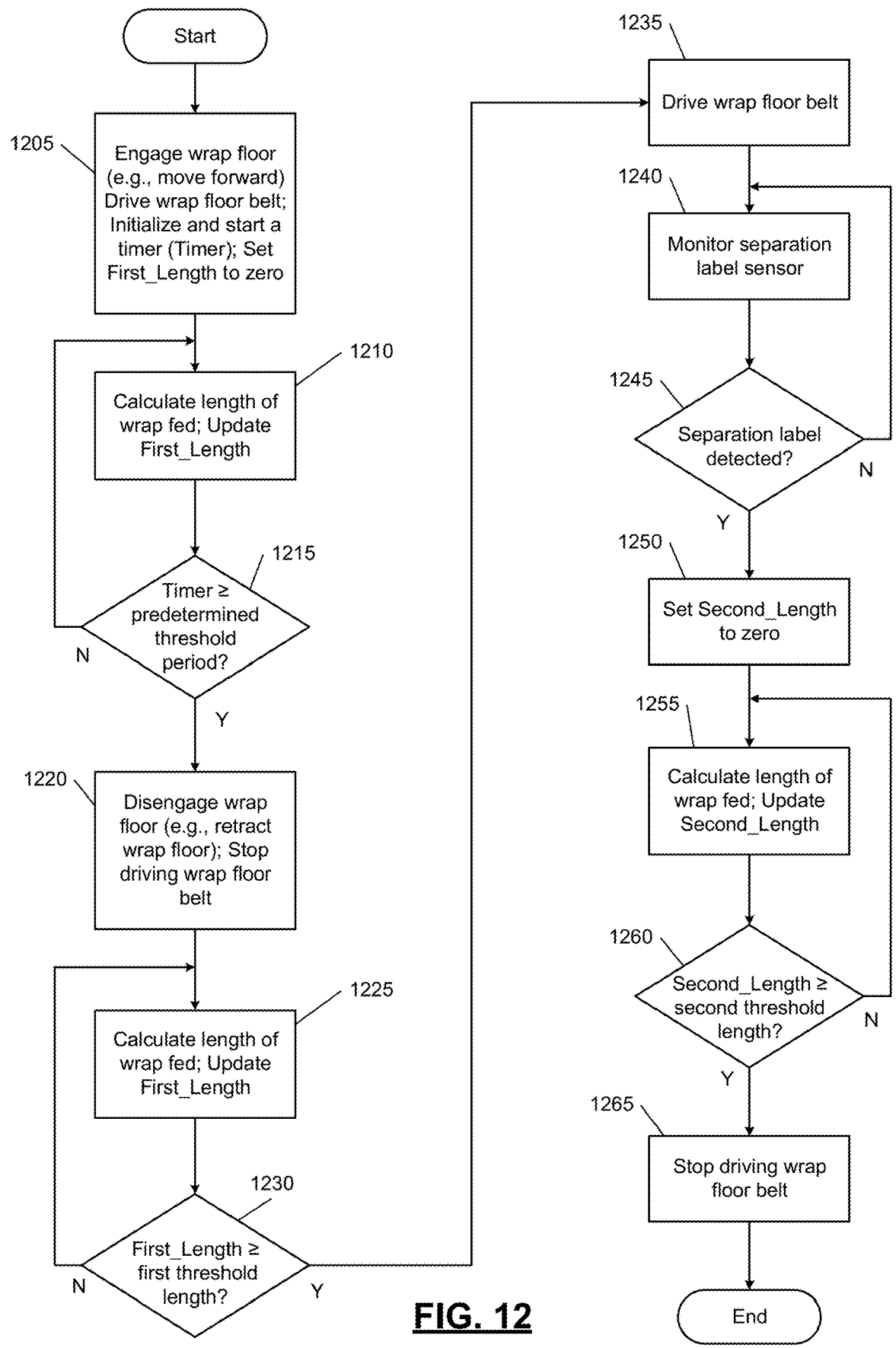
FIG. 12 is a flowchart of example operations performed by an implementation of the wrap feeding control system.

FIG. 12 is a flowchart depicting an example method of controlling a wrap floor of the harvester 10, such as the wrap floor system 520. In an example implementation, control may be performed by the wrap floor control module 1150. In other implementations, control may be performed by a baler interface controller (BIC) or another controller of the harvester 10.

Control begins at 1205 of FIG. 12 upon initiation of a wrap cycle. At 1205, control engages the wrap floor and drives the wrap floor belt. For example, the floor engagement module 1155 commands the wrap floor actuator 155 to move the wrap floor into an engaged position and the belt control module 1160 engages the wrap floor clutch 160. At 1205, control also initializes and starts a timer (Timer) and sets a first measured length of wrap (First_Length) to zero. Control continues with 1210.

At 1210, control calculates the length of wrap fed to the module forming chamber 185 and updates the first measured length of wrap (First_Length). For example, the first length module 1120 updates the first measured length based on the signal received from the wrap roller speed sensor 170. At 1215, control determines whether the value of the timer (Timer) is greater than or equal to a threshold period of time. For example, the timer module 1110 indicates that the timer value is greater than or equal to the stored period. If so, control transfers to 1220; otherwise, control returns to 1210.

At 1220, control disengages the wrap floor and stops driving the wrap floor belt. For example, the floor engagement module 1155 commands the wrap floor actuator 155 to move the wrap floor into a disengaged position and the belt control module 1160 disengages the wrap floor clutch 160. Control continues with 1225, where control calculates the length of wrap fed to the module forming chamber 185 and updates the first measured length of wrap (First_Length). Control then progresses to 1230.

At 1230, control determines whether the first measured length of wrap (First_Length) is greater than or equal to a first threshold length. For example, the first length module 1120 indicates that the first measured length of wrap is greater than or equal to the first threshold value. If so, control progresses to 1235; otherwise, control returns to 1225.

At 1235, control drives the wrap floor belt. For example, the belt control module 1160 engages the wrap floor clutch 160. At 1240, control monitors for the presence of a separation label on the wrap being fed to the module forming chamber 185. For example, the second length module 1140 monitors the signal from the separation label sensor 165. At 1245, control determines whether a separation label is detected. If so, control continues with 1250; otherwise, control returns to 1240.

At 1250, control resets a second measured length of wrap (Second_Length). For example, the second length module 1140 sets the second measured length to zero. At 1255, control calculates the length of wrap fed to the module forming chamber 185 and updates the second measured length of wrap (Second_Length). Control continues with 1260.

At 1260, control determines whether the second measured length of wrap is greater than or equal to a second threshold length. For example, the second length module 1140 indicates that the second measured length of wrap is greater than or equal to the second threshold value. If so, control progresses to 1265; otherwise, control returns to 1255.

At 1265, control stops driving the wrap floor belt. For example, the belt control module 1160 disengages the wrap floor clutch 160. Control then ends.

Figure 13:
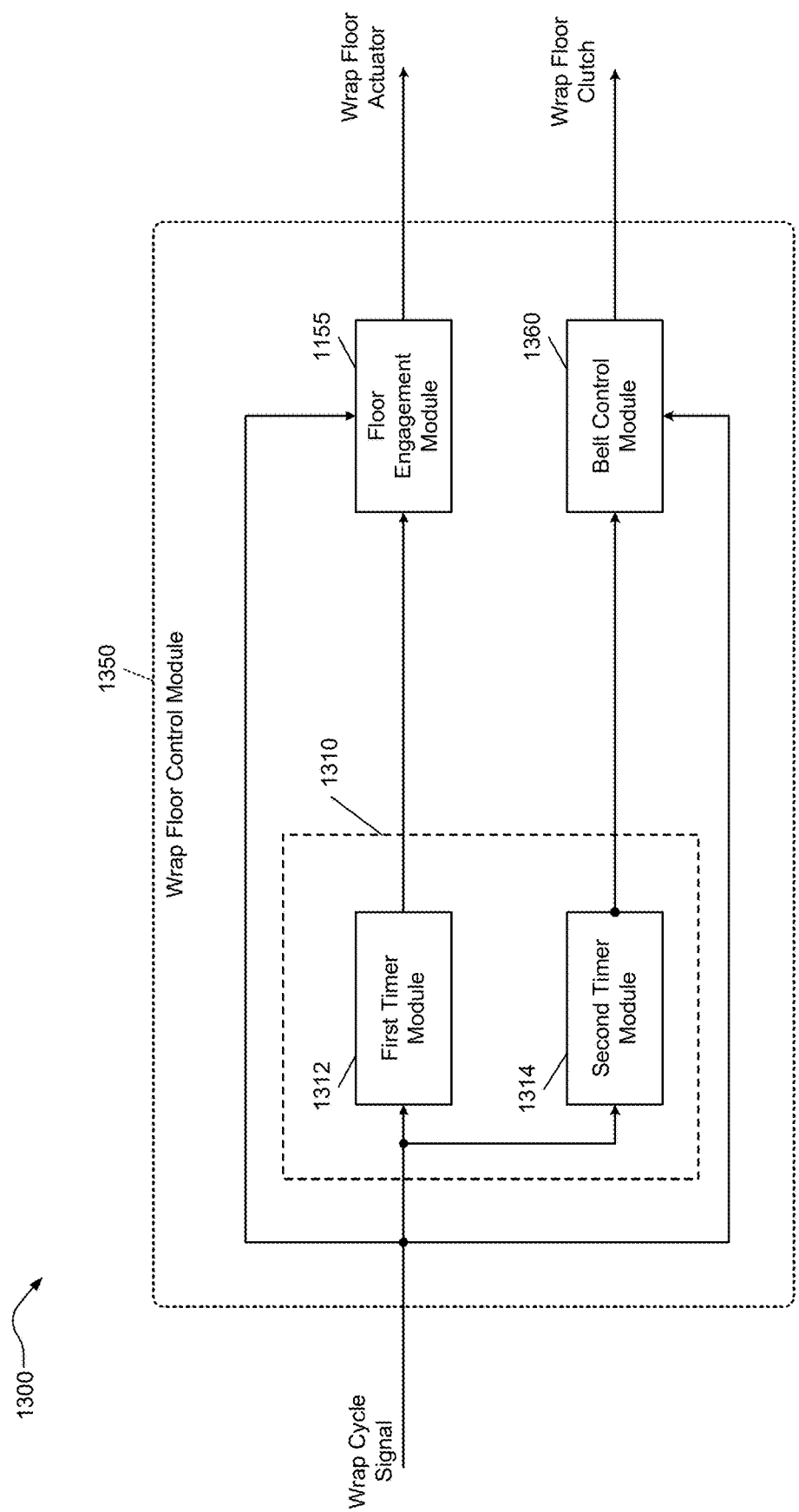
FIG. 13 is functional block diagram of another example implementation of a wrap feeding control system according to the principles of the present disclosure.

FIG. 13 is a functional block diagram of an example implementation of a wrap floor control system 1300. In various implementations, the wrap floor control system 1300 includes a wrap floor control module 1350, the wrap floor actuator 155, the wrap floor clutch 160, and the wrap roller speed sensor 170. The wrap floor control module 1350 is another implementation of the wrap floor control module 150 and may include a first timer module 1312, a second timer module 1314, the floor engagement module 1155, and a belt control module 1360.

In various examples, the wrap floor control module 1350 may be a standalone module in the harvester 10, as illustrated in the example of FIG. 2. In other examples, at least one of the first timer module 1312, the second timer module 1314, the floor engagement module 1155, and the belt control module 1360 may be implemented independently or with one or more other modules of the harvester 10—for example, a baler interface controller (BIC).

The first timer module 1312 generates a timer value that indicates the amount of time that has elapsed since a wrap cycle was initiated. In response to receiving a signal that indicates initiation of a wrap cycle, the first timer module 1312 resets a first timer to zero and then begins to increment the first timer. The first timer module 1312 compares the first timer value to a first period (or value) and outputs the results of the comparison to the floor engagement module 1155. In some implementations, the first period is a predetermined period. For example, the first period may be or correspond to approximately 5 seconds. In other implementations, the first period may be set to an initial period—for example, 5 seconds—and an operator of the harvester 10, via the operator interface 45, may change the first period to another suitable period.

Similar to the first timer module 1312, the second timer module 1314 generates a timer value that indicates the amount of time that has elapsed since a wrap cycle was initiated. In response to receiving the signal that indicates initiation of a wrap cycle, the second timer module 1314 resets a second timer to zero and then begins to increment the second timer. The second timer module 1314 compares the second timer value to a second period (or value) and outputs the results of the comparison to the belt control module 1360. In some implementations, the second period is a predetermined period. For example, the second period may be or correspond to approximately 15 seconds. In other implementations, the second period may be set to an initial period—for example, 15 seconds—and an operator of the harvester 10, via the operator interface 45, may change the second period to another suitable period.

In some implementations, the first timer module 1312 and the second timer module 1314 may be separate modules in the wrap floor control module 1350, as illustrated in FIG. 13. In other examples, the wrap floor control module 1350 may include a timer module 1310 that includes both the first timer module 1312 and the second timer module 1314.

The belt control module 1360 generates a signal to drive the wrap floor belts in response to receiving a signal that indicates initiation of a wrap cycle. The belt control module 1360 generates a signal to stop driving the wrap floor belts to be driven in response to determining the second timer module 1312 indicates that the second period of time has elapsed since the wrap cycle was initiated.

Figure 14:
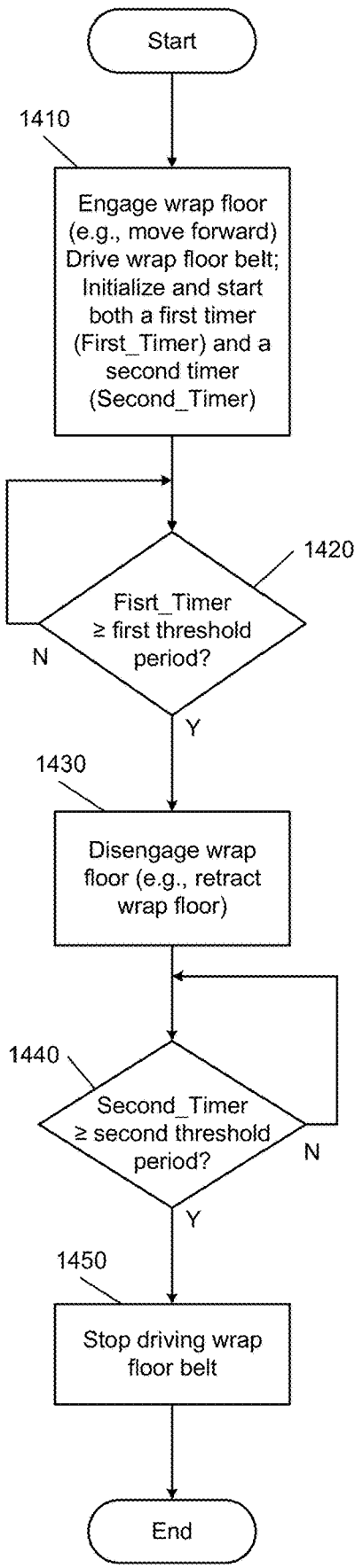
FIG. 14 is a flowchart of example operations performed by another implementation of the wrap feeding control system.

FIG. 14 is a flowchart depicting another example method of controlling a wrap floor of the harvester 10, such as the wrap floor system 520. In an example implementation, control may be performed by the wrap floor control module 1350. In other implementations, control may be performed by a baler interface controller (BIC) or another controller of the harvester 10.

Control begins at 1410 of FIG. 14 upon initiation of a wrap cycle. At 1410, control engages the wrap floor and drives the wrap floor belt. For example, the floor engagement module 1155 commands the wrap floor actuator 155 to move the wrap floor into the engaged position and the belt control module 1360 engages the wrap floor clutch 160. At 1405, control also initializes both a first timer (First_Timer) and a second timer (Second_Timer). Control continues with 1420.

At 1420, control determines whether the value of the first timer (First_Timer) is greater than or equal to a first threshold period of time. For example, the first timer module 1312 indicates that the first timer value is greater than or equal to the stored first period. If so, control transfers to 1430; otherwise, control returns to 1420.

At 1430, control disengages the wrap floor. For example, the floor engagement module 1155 commands the wrap floor actuator 155 to move the wrap floor into the disengaged position. Control continues with 1440, control determines whether the value of the second timer (Second_Timer) is greater than or equal to a second threshold period of time. For example, the second timer module 1314 indicates that the second timer value is greater than or equal to the stored second period. If so, control transfers to 1450; otherwise, control returns to 1440.

At 1450, control stops driving the wrap floor belt. For example, the belt control module 1360 disengages the wrap floor clutch 160. Control then ends.

Figure 15:
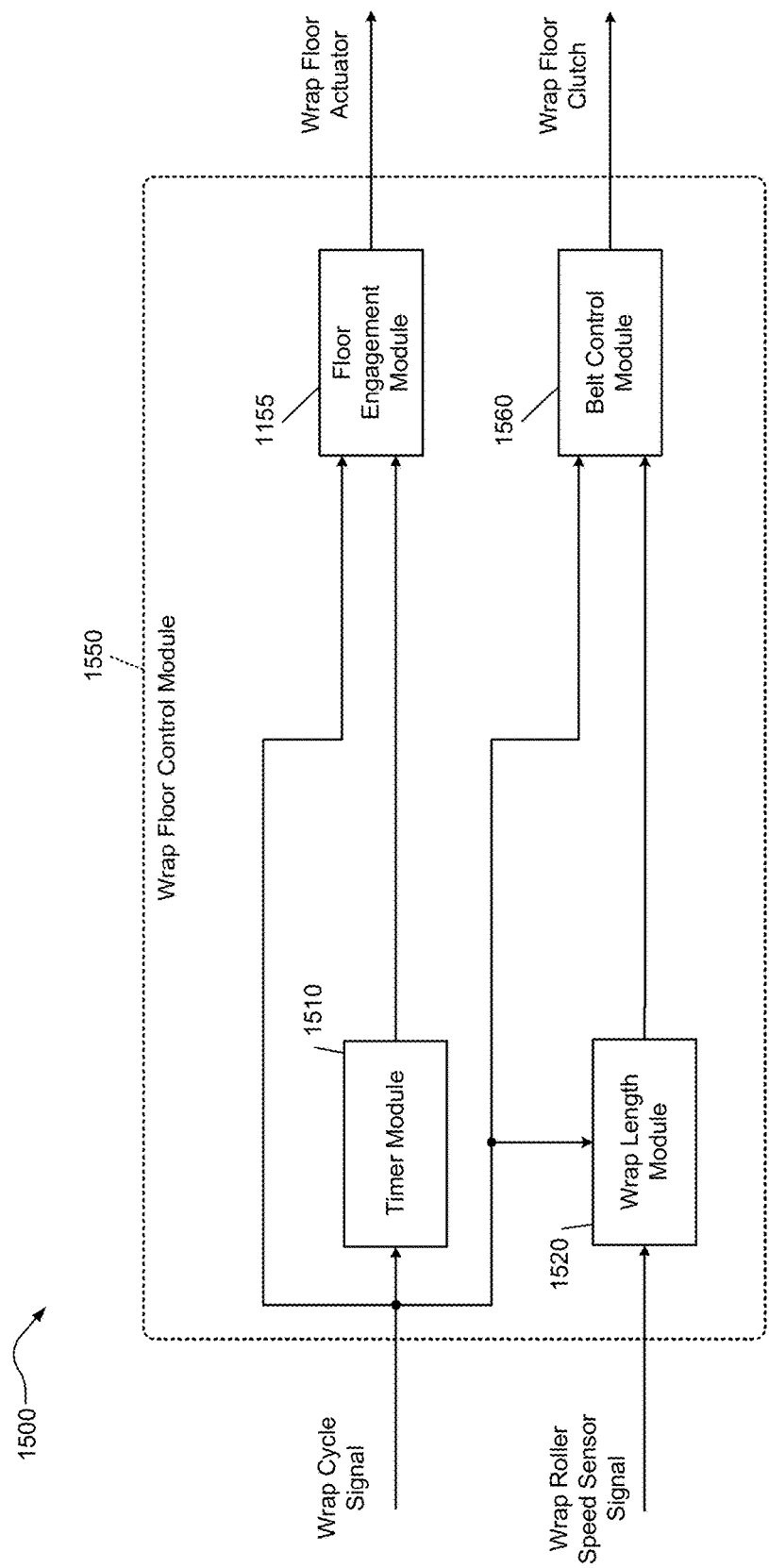
FIG. 15 is functional block diagram of yet another example implementation of a wrap feeding control system according to the principles of the present disclosure.

FIG. 15 is a functional block diagram of an example implementation of a wrap floor control system 1500. In various implementations, the wrap floor control system 1500 includes a wrap floor control module 1550, the wrap floor actuator 155, the wrap floor clutch 160, and the wrap roller speed sensor 170. The wrap floor control module 1550 is yet another implementation of the wrap floor control module 150 and may include a timer module 1510, a wrap length module 1520, the floor engagement module 1155, and a belt control module 1560.

In various examples, the wrap floor control module 1550 may be a standalone module in the harvester 10, as illustrated in the example of FIG. 2. In other examples, at least one of the timer module 1510, the wrap length module 1520, the floor engagement module 1155, and the belt control module 1560 may be implemented independently or with one or more other modules of the harvester 10—for example, a baler interface controller (BIC).

The timer module 1510 generates a timer value that indicates the amount of time that has elapsed since a wrap cycle was initiated. In response to receiving a signal that indicates initiation of a wrap cycle, the timer module 1510 resets a timer to zero and then begins to increment the timer. The timer module 1510 compares the timer value to a period (or value) and outputs the results of the comparison to the floor engagement module 1155. In some implementations, the period is a predetermined period. For example, the period may be or correspond to approximately 5 seconds. In other implementations, the period may be set to an initial period—for example, 5 seconds—and an operator of the harvester 10, via the operator interface 45, may change the period to another suitable period.

The wrap length module 1520 receives a signal from the wrap roller speed sensor 170. The circumference of the wrap roller is stored in the wrap length module 1520. Based on the signal received from the wrap roller speed sensor 170, the wrap length module 1520 calculates the length of wrap fed to the module forming chamber 185 since the wrapping cycle was initiated.

In response to receiving a signal that indicates initiation of the wrap cycle, the wrap length module 1520 resets a measured wrap length to zero. The wrap length module 1520 then updates the value of the measured wrap length based on the received wrap roller speed signal, the circumference of the roller, and the amount of time that has elapsed since the value of the measured wrap length was last updated. The wrap length module 1520 continues to update the measured wrap length until it receives a signal that indicates that a new wrap cycle has been initiated.

The wrap length module 1520 compares the measured wrap length to a threshold value and outputs the results of the comparison to the belt control module 1560. In some implementations, the threshold value is a predetermined length. For example, the threshold value may be or correspond to 21 meters. As another example, the first threshold value may be or corresponds to 16-24 meters. In other implementations, the first threshold value may be set to an initial value—for example, 21 meters—and an operator of the harvester 10, via the operator interface 45, may change the threshold value to another suitable length.

The belt control module 1560 generates a signal to drive the wrap floor belts in response to receiving a signal that indicates initiation of a wrap cycle. The belt control module 1560 generates a signal to stop driving the wrap floor belts to be driven in response to determining the wrap length module 1520 indicates that determined length of wrap has been fed to the module forming chamber 185.

Figure 16:
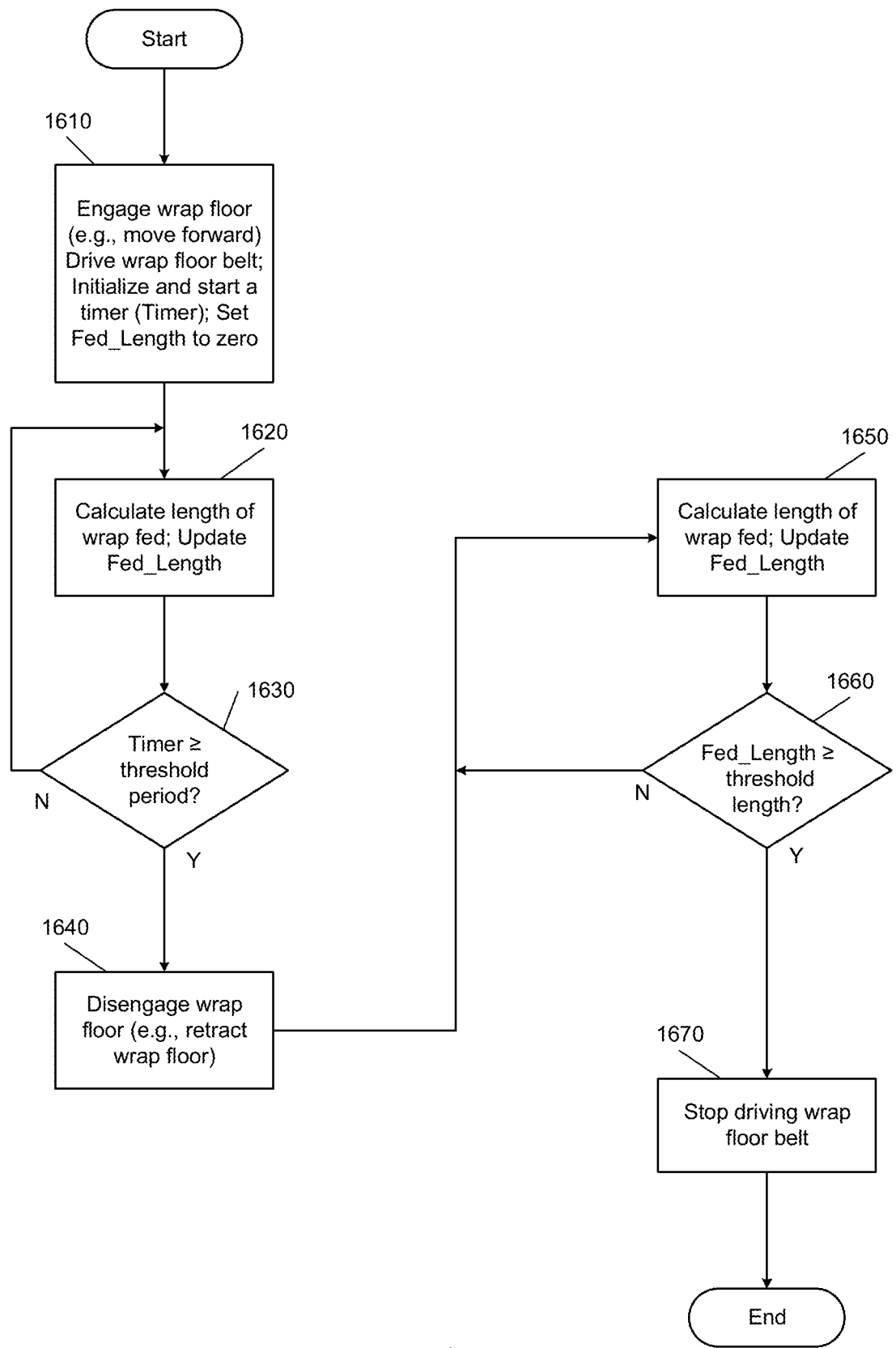
FIG. 16 is a flowchart of example operations performed by yet another implementation of the wrap feeding control system.

FIG. 16 is a flowchart depicting yet another example method of controlling a wrap floor of the harvester 10, such as the wrap floor system 520. In an example implementation, control may be performed by the wrap floor control module 1550. In other implementations, control may be performed by a baler interface controller (BIC) or another controller of the harvester 10.

Control begins at 1610 of FIG. 16 upon initiation of a wrap cycle. At 1605, control engages the wrap floor and drives the wrap floor belt. For example, the floor engagement module 1155 commands the wrap floor actuator 155 to move the wrap floor into an engaged position and the belt control module 1560 engages the wrap floor clutch 160. At 1610, control also initializes a timer (Timer) and sets a measured length of wrap (Fed_Length) to zero. Control continues with 1620.

At 1620, control calculates the length of wrap fed to the module forming chamber 185 and updates the measured length of wrap (Fed_Length). For example, the wrap length module 1520 updates the measured length based on the signal received from the wrap roller speed sensor 170. At 1630, control determines whether the value of the timer (Timer) is greater than or equal to a threshold period of time. For example, the timer module 1510 indicates that the timer value is greater than or equal to the stored period. If so, control transfers to 1640; otherwise, control returns to 1620.

At 1640, control disengages the wrap floor and stops driving the wrap floor belt. For example, the floor engagement module 1155 commands the wrap floor actuator 155 to move the wrap floor into a disengaged position and the belt control module 1560 disengages the wrap floor clutch 160. Control continues with 1650, where control calculates the length of wrap fed to the module forming chamber 185 and updates the measured length of wrap (Fed_Length). Control then progresses to 1660.

At 1660, control determines whether the measured length of wrap (Fed_Length) is greater than or equal to a threshold length. For example, the wrap length module 1520 indicates that the measured length of wrap is greater than or equal to the stored threshold value. If so, control progresses to 1670; otherwise, control returns to 1650.

At 1670, control stops driving the wrap floor belt. For example, the belt control module 1560 disengages the wrap floor clutch 160. Control then ends.

Figure 17:
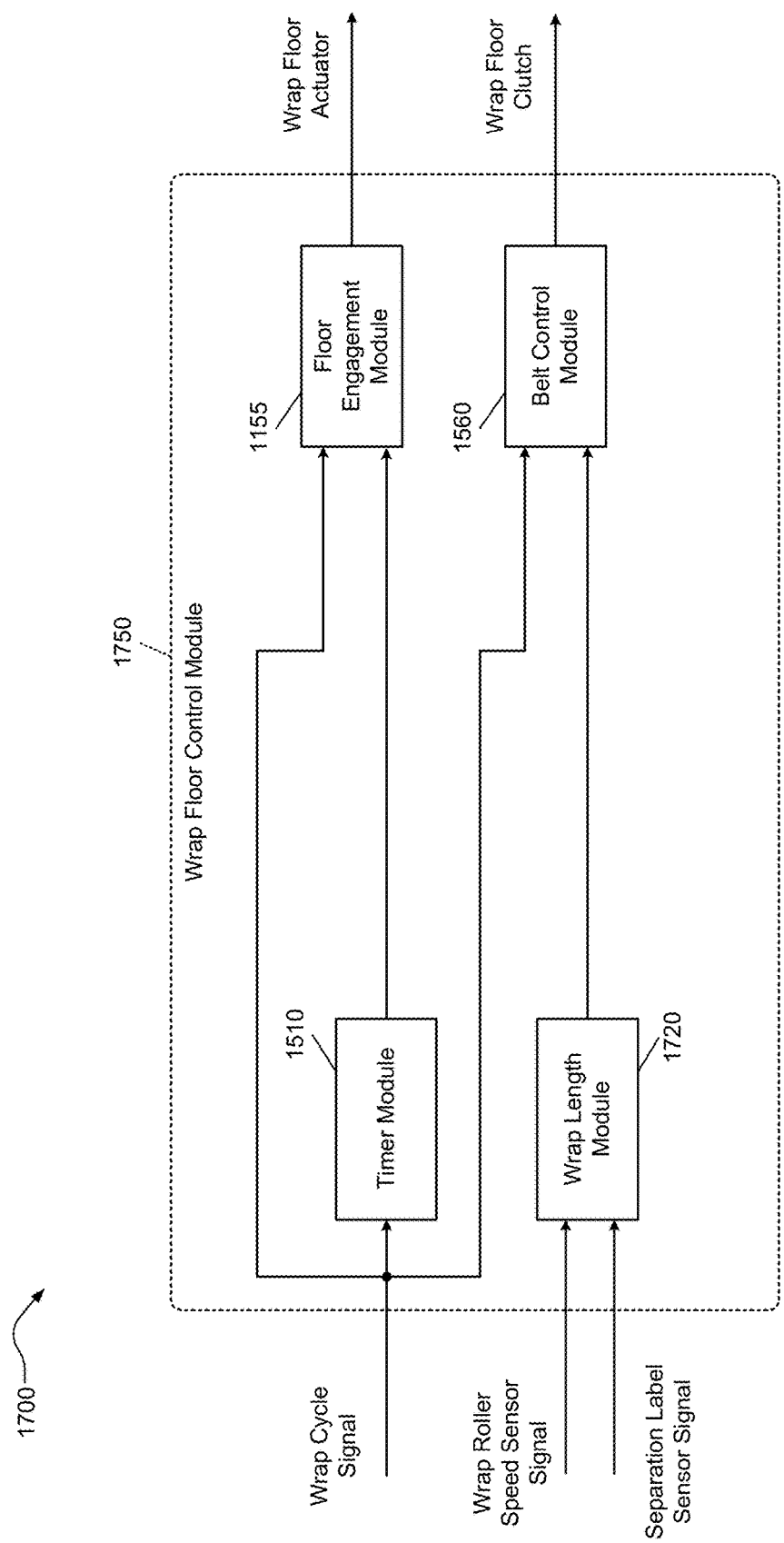
FIG. 17 is functional block diagram of yet another example implementation of a wrap feeding control system according to the principles of the present disclosure.

FIG. 17 is a functional block diagram of an example implementation of a wrap floor control system 1700. In various implementations, the wrap floor control system 1700 includes a wrap floor control module 1750, the wrap floor actuator 155, the wrap floor clutch 160, and the wrap roller speed sensor 170. The wrap floor control module 1750 is yet another implementation of the wrap floor control module 150 and may include the timer module 1510, a wrap length module 1720, the floor engagement module 1155, and a belt control module 1560.

In various examples, the wrap floor control module 1750 may be a standalone module in the harvester 10, as illustrated in the example of FIG. 2. In other examples, at least one of the timer module 1510, the wrap length module 1720, the floor engagement module 1155, and the belt control module 1560 may be implemented independently or with one or more other modules of the harvester 10—for example, a baler interface controller (BIC).

The wrap length module 1720 receives a signal from the wrap roller speed sensor 170 and the separation label sensor 165. The circumference of the wrap roller is stored in the wrap length module 1720. Based on the signal received from the wrap roller speed sensor 170, the wrap length module 1720 calculates the length of wrap fed to the module forming chamber 185 since the separation label sensor 165 last detected the presence of a separation label.

In response to receiving a signal that indicates the presence of a separation label, the wrap length module 1720 resets a measured wrap length to zero. The wrap length module 1720 then updates the value of the measured wrap length based on the received wrap roller speed signal, the circumference of the roller, and the amount of time that has elapsed since the value of the measured wrap length was last updated. The wrap length module 1720 continues to update the measured wrap length until it receives another signal that indicates the presence of a separation label.

The wrap length module 1720 compares the measured wrap length to a threshold value and outputs the results of the comparison to the belt control module 1560. In some implementations, the threshold value is a predetermined length. For example, the threshold value may be or correspond to 0.9 meters. As another example, the first threshold value may be or corresponds to 0.5-1.5 meters. In other implementations, the first threshold value may be set to an initial value—for example, 0.9 meters—and an operator of the harvester 10, via the operator interface 45, may change the threshold value to another suitable length.

Figure 18:
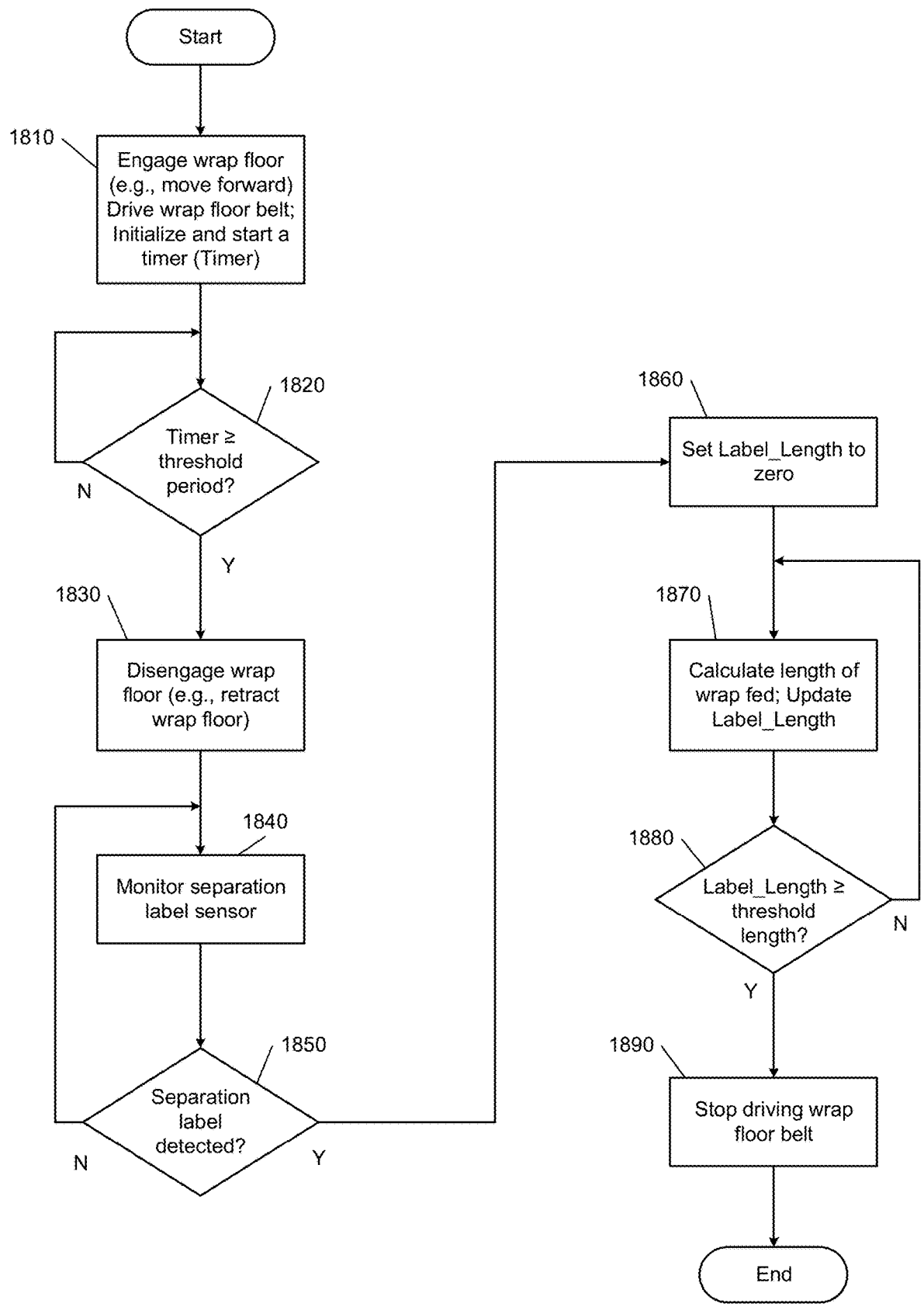
FIG. 18 is a flowchart of example operations performed by yet another implementation of the wrap feeding control system.

FIG. 18 is a flowchart depicting yet another example method of controlling a wrap floor of the harvester 10, such as the wrap floor system 520. In an example implementation, control may be performed by the wrap floor control module 1750. In other implementations, control may be performed by a baler interface controller (BIC) or another controller of the harvester 10.

Control begins at 1810 of FIG. 18 upon initiation of a wrap cycle. At 1810, control engages the wrap floor and drives the wrap floor belt. For example, the floor engagement module 1155 commands the wrap floor actuator 155 to move the wrap floor into an engaged position and the belt control module 1560 engages the wrap floor clutch 160. At 1810, control also initializes and starts a timer (Timer). Control continues with 1820.

At 1820, control determines whether the value of the timer (Timer) is greater than or equal to a threshold period of time. For example, the timer module 1510 indicates that the timer value is greater than or equal to the stored period. If so, control transfers to 1830; otherwise, control returns to 1820.

At 1830, control disengages the wrap floor. For example, the floor engagement module 1155 commands the wrap floor actuator 155 to move the wrap floor into a disengaged position. Control continues with 1840, where control monitors for the presence of a separation label on the wrap being fed to the module forming chamber 185. For example, the wrap length module 1720 monitors the signal from the separation label sensor 165. At 1850, control determines whether a separation label is detected. If so, control continues with 1860; otherwise, control returns to 1840.

At 1860, control resets a measured length of wrap (Label_Length). For example, the wrap length module 1720 sets the measured length to zero. At 1870, control calculates the length of wrap fed to the module forming chamber 185 and updates the measured length of wrap (Label_Length). Control continues with 1880.

At 1880, control determines whether the measured length of wrap is greater than or equal to a threshold length. For example, the wrap length module 1720 indicates that the measured length of wrap is greater than or equal to the threshold value. If so, control progresses to 1890; otherwise, control returns to 1870.

At 1890, control stops driving the wrap floor belt. For example, the belt control module 1560 disengages the wrap floor clutch 160. Control then ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 122(f) unless an element is expressly recited using the phrase "means for," or in the case of a method claim using the phrases "operation for" or "step for."

What is claimed is:

1. A wrap floor control system for a wrap floor of a cotton harvester with a cotton module forming chamber, the wrap floor control system comprising:
   an actuator connected to the wrap floor and configured to move the wrap floor;
   a timer module configured to:
      in response to determining initiation of a wrap cycle, reset and increment a timer; and
      compare the timer to a first threshold value;
   a floor engagement module configured to:
      in response to determining initiation of the wrap cycle, command the wrap floor actuator to move the wrap floor to an engaged position, and
      in response determining that the timer module indicates that the timer is equal to or greater than the first threshold value, command the wrap floor actuator to move the wrap floor to a disengaged position;
   a belt control module configured to in response to determining initiation of the wrap cycle, drive a wrap floor belt; and
   a label sensor configured to generate a separation label signal in response to detecting a presence of a separation label, wherein the label sensor is a Hall sensor; and
   a wrap length module configured to:
      calculate, in response to receiving the separation signal, a length of wrap fed to the cotton module forming chamber, and
      compare the length of wrap fed to the cotton module forming chamber to a second threshold value,
   wherein the belt control module is configured to, in response to determining that the wrap length module indicates that the length of wrap fed to the cotton module forming chamber is equal to or greater than the second threshold value, stop driving the wrap floor belt.

2. The wrap floor control system of claim 1, comprising a wrap floor clutch, wherein the belt control module is configured to engage the wrap floor clutch to drive the wrap floor belt.

3. The wrap floor control system of claim 1, wherein the wrap floor actuator is a hydraulic cylinder.

4. The warp floor control system of claim 1, wherein the belt control module is configured to stop, in response to determining that the timer module indicates that the timer is equal to or greater than the first threshold value, driving the wrap floor belt.

5. The wrap floor control system of claim 4, further comprising:
   a wrap length module configured to:
      in response to determining initiation of the wrap cycle, calculate a length of wrap fed to the cotton module forming chamber, and
      compare the length of wrap fed to the cotton module forming chamber to a second threshold value,
   wherein the belt control module is configured to, in response to determining that the wrap length module indicates that the length of wrap fed to the cotton module forming chamber is equal to or greater than the second threshold value, drive the wrap floor belt.

6. The wrap floor control system of claim 5, further comprising a wrap roller speed sensor configured to measure a speed of a wrap roller and generate a signal based on the measured speed,
   wherein the first length module is configured to calculate the first length based on the signal generated by the wrap roller speed sensor.

7. The wrap floor control system of claim 5, wherein the second threshold value corresponds to 18 meters.

8. A method of controlling a wrap floor of a cotton harvester with a cotton module forming chamber, the method comprising:
   determining whether a wrap cycle has been initiated and in response to determining that the wrap cycle has been initiated:
      starting a timer,
      moving the wrap floor to an engaged position, and
      driving a wrap floor belt located in the wrap floor;
   comparing the timer to a threshold period;
   moving, in response to determining that the timer is greater than or equal to the threshold period, the wrap floor to a disengaged position;
   monitoring an output of a label sensor;
   calculating, in response to the label sensor indicating a presence of a separation label, a first length of wrap fed to the module forming chamber;
   stopping, in response to determining that the first length of wrap fed to the module forming chamber is greater than or equal to a first threshold value, the wrap floor belt;

stopping, in response to determining that the timer is greater than or equal to the threshold period, the wrap floor belt;

calculating a second length of wrap fed to the module forming chamber; and driving, in response to determining that the second length of wrap fed to the module forming chamber is greater than or equal to a second threshold value, the wrap floor belt.

9. The method of claim 8, wherein the threshold period is 5 seconds.

10. The method of claim 8, wherein the first threshold value is 0.9 meters or the second threshold value is 18 meters.

11. The method of claim 8, further comprising monitoring a speed of a wrap roller of the cotton harvester, wherein calculating the second length of wrap fed to the module forming chamber includes calculating the second length based on the speed of the wrap roller.

12. The method of claim 11, wherein the monitoring the speed of a wrap roller includes monitoring the speed of a lower wrap roller.

13. The method of claim 8, wherein monitoring an output of a label sensor includes monitoring the output of a Hall sensor.

14. A non-transitory computer-readable medium storing processor-executable instructions for controlling a wrap floor of a cotton harvester with a cotton module forming chamber, the instructions comprising:

determining whether a wrap cycle has been initiated and in response to determining that the wrap cycle has been initiated:

starting a timer;

moving the wrap floor to an engaged position, and driving a wrap floor belt located in the wrap floor;

comparing the timer to a threshold period;

moving, and in response to determining that the timer is greater than or equal to the threshold period the wrap floor to a disengaged position;

monitoring an output of a label sensor;

calculating, in response to the label sensor indicating a presence of a separation label, a first length of wrap fed to the module forming chamber;

stopping, in response to determining that the first length of wrap fed to the module forming chamber is greater than or equal to a first threshold value, the wrap floor belt;

stopping, in response to determining that the timer is greater than or equal to the threshold period, the wrap floor belt, calculating a second length of wrap fed to the module forming chamber; and driving, in response to determining that the second length of wrap fed to the module forming chamber is greater than or equal to a second threshold value, the wrap floor belt.

15. The non-transitory computer-readable medium of claim 14, wherein the threshold period is 5 seconds.

16. The non-transitory computer-readable medium of claim 14, the instructions further comprising monitoring a speed of a wrap roller of the cotton harvester, wherein calculating the first length of wrap fed to the module forming chamber includes calculating the first length based on the speed of the wrap roller.

17. The non-transitory computer-readable medium of claim 14, wherein the first threshold value is 0.9 meters or the second threshold value is 18 meters.

18. The non-transitory computer-readable medium of claim 14, wherein monitoring an output of a label sensor includes monitoring the output of a Hall sensor.

* * * * *